(12) United States Patent
Sinha et al.

(10) Patent No.: US 6,718,266 B1
(45) Date of Patent: Apr. 6, 2004

(54) DETERMINATION OF DIPOLE SHEAR ANISOTROPY OF EARTH FORMATIONS

(75) Inventors: Bikash K. Sinha, West Redding, CT (US); Sandip Bose, Bridgeport, CT (US); Xiaojun Huang, Arlington, MA (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 10/284,612

(22) Filed: Oct. 31, 2002

(51) Int. Cl.$^7$ .................................................. G01V 1/28

(52) U.S. Cl. .............................. 702/11; 702/18; 367/75

(58) Field of Search ................................ 702/6, 14, 11, 702/17, 7, 18

(56) References Cited

U.S. PATENT DOCUMENTS

| | | | | |
|---|---|---|---|---|
| 5,278,805 A | * | 1/1994 | Kimball | 367/32 |
| 5,808,963 A | * | 9/1998 | Esmersoy | 367/31 |

OTHER PUBLICATIONS

Ekstrom, M. P. "Dispersion Estimation from Borehole Acoustic Arrays Using a Modified Matrix Pencil Algorithm". *29th Asilomar Conf. on Signals, Systems, and Computers* (Oct. 31, 1995), p. 1–5.

Esmersoy, C. et al. "Dipole Shear Anisotropy Logging". *Expanded Abstracts*, 64th Ann. Internat. Mtg., Soc. Expl. Geophys., pp. 1139–1142 (1994).

Harrison, A. R. et al. "Acquistion and Analysis of Sonic Waveforms from a Borehole Monopole and Dipole Source for the Determination of Compressional and Shear Speeds and their Relation to Rock Mechanical Properties and Surface Seismic Data". *SPE 20557*, SPE Annual Tech. Conf. and Exhibition (Sep. 23–26, 1990), p. 267–282.

Kimball, C. V. et al. "Semblance Processing of Borehole Acoustic Array Data". *Geophysics*, vol. 49, pp. 274–281 (1984).

Kimball, C. V. et al. "Shear Slowness Measurements by Dispersive Processing of the Borehole Flexural Mode". *Geophysics*, vol. 63, pp. 337–344 (1998).

Kurkjian, A. L. et al. Acoustic Multipole Sources in Fluid–Filled Boreholes, *Geophysics*, vol. 51, pp. 148–163 (1986).

Mueller, M. et al. "Case Studies of the Dipole Shear Anisotropy Log". *Expanded Abstracts*, 64th Ann. Internat. Mtg., Soc. Expl. Geophys., pp. 1143–1146 (1994).

Nolte, B. et al. "Dispersion Analysis of Split Flexural Waves". *Earth Research Laboratory Report* (MIT) (Jun. 9, 1997), p. 1–27.

Norris, A. N. et al. "Weak Elastic Anisotrophy and the Tube Wave". *Geophysics*, vol. 58, Sec. 8, pp. 1091–1098 (1993).

(List continued on next page.)

*Primary Examiner*—Donald E. McElheny, Jr.
(74) *Attorney, Agent, or Firm*—Martin M. Novack; William B. Batzer; John J. Ryberg

(57) ABSTRACT

A method for determining formation shear slowness of formations surrounding an earth borehole that includes: transmitting sonic energy into the formations from a dipole source in the borehole; measuring signals from orthogonal wave components that have traveled through the formations at each of a plurality of receiver locations in the borehole, spaced at a respective plurality of distances from the transmitter location; transforming the signals to the frequency domain and separating dispersive and non-dispersive portions of the transformed signals; and determining fast and slow shear slowness of the formation from the low frequency asymptotes of the dispersive portions of the transformed signals. Related methods for determining shear directionality and the magnitude of anisotropy of anisotropic formations surrounding an earth borehole and associated apparatus are also described.

58 Claims, 13 Drawing Sheets

OTHER PUBLICATIONS

Schmitt, D. P. "Shear Wave Logging in Elastic Formations". *J. Acoust. Soc. Am.*, vol. 84, pp. 2215–2229 (1988).

Schoenberg, M. et al. "Seismic Anisotropy of Fractured Rock." *Geophysics*, vol. 60, pp. 204–211 (1995).

Sinha, B. K. et al. "Borehole Flexural Modes in Anistropic Formations". *Geophysics* (vol. 59, pp 1037–1052 (1994).

Sinha, B. K. et al. "Stress–Induced Azimuthal Anisotropy in Borehole Flexural Waves". *Geophysics*, vol. 61, Sec. 6, pp. 1899–1907 (1996).

Sinha, B. K. "Sensitivity and Inversion of Borehole Flexural Dispersions for Formation Parameters". *Geophysics J. Int.*, vol. 128, Sec. 1, pp. 84–96 (1997).

Sinha, B. K. et al. "Case History: Dipole Dispersion Crossover and Sonic Logs in a Limestone Reservoir". *Geophysics*, vol. 65, No. 2, pp. 390–407 (Mar.–Apr. 2000).

Stevens, J. L. et al. "Shear Velocity Logging in Slow Formations Using the Stoneley Waves". *Geophysics*, vol. 51, pp. 137–147 (1986).

Tang, X. M. et al. "Borehole Stoneley Wave Propagation Across Permeable Structures". *Geophysical Prospecting*, vol. 41, pp. 165–187 (1993).

Winkler, K. W. et al. "Permeability and Borehole Stonely Waves: Comparison Between Experiment and Theory". *Geophysics*, vol. 54, pp. 66–75 (1989).

\* cited by examiner

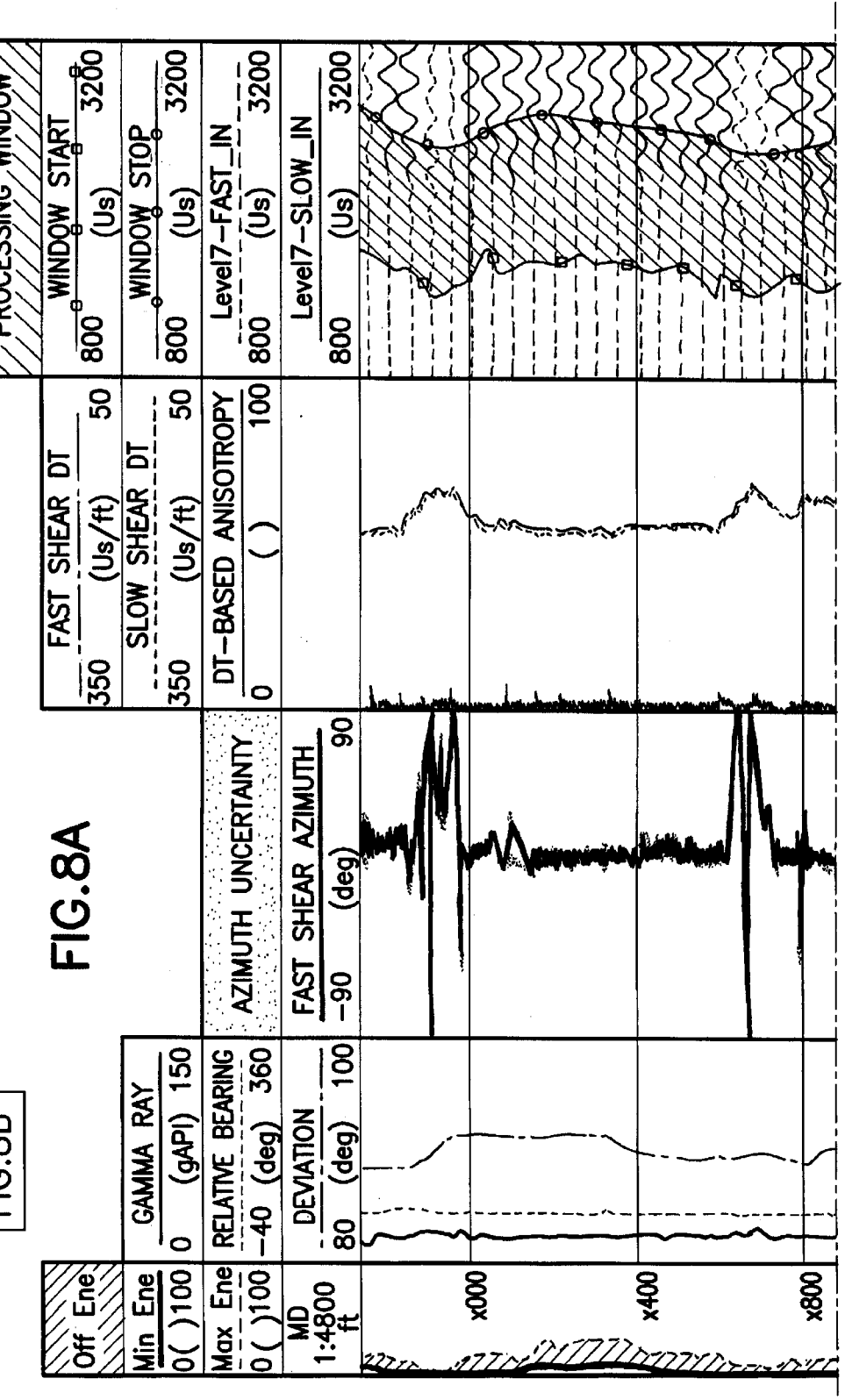

DETERMINATION OF DIPOLE SHEAR ANISOTROPY OF EARTH FORMATIONS

FIELD OF THE INVENTION

This invention relates to investigation of earth formations and, more particularly, to a method and apparatus for obtaining properties of earth formations using sonic logging and determining dipole shear anisotropy and related characteristics of the earth formations.

BACKGROUND OF THE INVENTION

It is well known that mechanical disturbances can be used to establish acoustic waves in earth formations surrounding a borehole, and the properties of these waves can be measured to obtain important information about the formations through which the waves have propagated. Parameters of compressional, shear, and Stoneley waves, such as their velocity (or its reciprocal, slowness) in the formation and in the borehole, can be indicators of formation characteristics that help in evaluation of the location and/or producibility of hydrocarbon resources.

An example of a logging device that has been used to obtain and analyze sonic logging measurements of formations surrounding an earth borehole is called a Dipole Shear Sonic Imager ("DSI"—trademark of Schlumberger), and is of the general type described in Harrison et al., "Acquisition and Analysis of Sonic Waveforms From a Borehole Monopole And Dipole Source For The Determination Of Compressional Arid Shear Speeds And Their Relation To Rock Mechanical Properties And Surface Seismic Data", Society of Petroleum Engineers, SPE 20557, 1990. In conventional use of the DSI logging tool, one can present compressional slowness, $\Delta t_c$, shear slowness, $\Delta t_s$, and Stoneley slowness, $\Delta t_{st}$, each as a function of depth, z. [Slowness is the reciprocal of velocity and corresponds to the interval transit time typically measured by sonic logging tools.]

An acoustic source in a fluid-filled borehole generates headwaves as well as relatively stronger borehole-guided modes. A standard sonic measurement system consists of placing a piezoelectric source and an hydrpohone receivers inside a fluid-filled borehole. The piezoelectric source is configured in the form of either a monopole or a dipole source. The source bandwidth typically ranges from a 0.5 to 20 kHz. A monopole source generates primarily the lowest-order axisymmetric mode, also referred to as the Stoneley mode, together with compressional and shear headwaves. It can also excite pseudo-Rayleigh mode in fast formations. A pseudeo-Rayleigh mode asymptotes to the formation shear slowness at low (cut-in) frequencies and to the Scholte waves at high frequencies. All monopole measurements provide formation properties averaged in the plane perpendicular to the borehole axis.

A dipole source excites compressional headwaves at high frequencies and dispersive flexural mode at relatively lower frequencies in both the fast and slow formations. It can also excite shear headwaves in fast formations and leaky compressional modes in slow formations. The lowest-order leaky compressional mode asymptotes to the formation compressional slowness at low frequencies and to the borehole fluid compressional slowness at high frequencies. All dipole measurements have some azimuthal resolution in the measurement of formation properties. The degree of azimuthal resolution depends on the angular spectra of the transmitter and receivers.

The radial depth of investigation in the case of headwave logging is dependent on the transmitter to receiver spacing and any in-situ radial variations in formation properties that might be present. The radial depth of investigation in the case of modal logging is well characterized and it extends to about a wavelength. This implies that the low- and high-frequencies probe deep and shallow into the formation, respectively.

Most formations exhibit some degree of anisotropy. The formation shear anisotropy can be caused by aligned fractures, thin beddings or microlayering in shales. This type of anisotropy is called formation instrinsic anisotropy. Non-hydrostatic prestresses in a formation introduce stress-induced anisotropy. A dipole dispersion crossover is an indicator of stress-induced anisotropy dominating any instrinsic anisotropy that may also be present A present technique for measuring dipole shear anisotropy incudes recording the inline and crossline receiver waveforms from both the upper and lower dipole sources (C. Esmersoy, K. Koster, M. Williams, A. Boyd and M. Kane, Dipole Shear Anisotropy Logigng, $64^{th}$. Ann. Internat. Mtg., Soc. Expl. Geophys, Expanded Abstracts, 1139–1142, 1994). These sources are orthogonal to each other and spaces apart, for example by 6 inches. The inline and crossline receivers are oriented parallel and perpendicular to the dipole transmitter direction, respectively. A total of four sets of waveforms $u_{xx}$, $u_{xy}$, $u_{yy}$, and $u_{yx}$) are recorded at a given depth in a borehole. The first and second subscripts X and Y denote the dipole source and receiver orientations, respectively. The four sets of recorded waveforms are low-pass filtered and time-windowed and then subjected to the so-called Alford rotation algorithm that yields the fast or slow shear directions with respect to a reference dipole source direction. The recorded waveforms are then rotated by the aforementioned angle. The rotated waveforms correspond to the fast and slow flexural waveforms. These waveforms can then be processed by a known algorithm that yields the fast and slow shear slownesses, respectively. (See C. V. Kimball and T. L. Marzetta, Semblance Processing Of Borehole Acoustic Array Data, Geophysics, (49); 274–281, 1986; C. V. Kimball, Shear Slowness Measurement By Dispersive Processing Of The Borehole Flexural Mode, Geophysics, (63), 337–344, 1998.)

The described present technique for estimating formation fast shear azimuth is based on the following assumptions (see C. Esmersoy, K. Koster, M. Williams, A. Boyd and M. Kane, Dipole Shear Anisotropy Logigng, $64^{th}$. Ann. Internat. Mtg., Soc. Expl. Geophys, Expanded Abstracts, 1139–1142, 1994.)

a. It is assumed that the upper and lower dipole radiation characteristics are identically the same and that both the inline and crossline receivers are well matched.

b. The low-pass filtering of the recorded waveforms retains essentially the nondispersive part of the borehole flexural wave.

c. A depth matching of the recorded waveforms from the upper and lower dipole sources reduces the number of processed 8 waveforms to 7.

Since the Alford rotation algorithm assumes a nondispersive shear wave propagation, it is necessary to low-pass filter the recorded waveforms. Low-pass filtering of the waveforms also ensures removal of any headwave arrivals that might interfere with the shear slowness and the fast-shear direction processing of the dipole logs.

A processing time window is also selected extending over a couple of cycles at the beginning of the waveform. The placement of the processing window attempts to isolate a single flexural arrival from other possible arrivals in the waveforms.

The existing techniques have certain limitations and/or drawbacks, and it is among the objects of the present invention to provide improved technique and apparatus for determining shear slowness and directionality of anisotropic formations surrounding an earth borehole.

SUMMARY OF THE INVENTION

In accordance with a form of the invention, a system and technique are set forth that require recording of the inline and crossline receiver waveforms from only one dipole source. This eliminates the need for orthogonal source dipoles to have identical radiation characteristics. Further advantages of this approach include reduction in the amount of data and logging time to half of the referenced current procedure that requires four-component acquisition from the two orthogonal dipole sources.

As was noted above, in the existing technique, since the Alford rotation algorithm assumes a nondispersive shear wave propagation, it is necessary to low-pass filter the received waveforms. However, the more energetic part of the flexural waveforms is at somewhat higher frequencies.

As was also noted above, in the existing technique the placement of the processing window attempts to isolate a single flexural arrival from other possible arrivals in the received waveforms. However, the resulting shear anisotropy, especially the orientation of anisotropy is very sensitive to the length of the time window over which the rotation is carried out (B. Nolte, R. Rao and X. Huang, Dispersion Analysis Of Split Flexural Waves, Earth Research Laboratory Report, MIT, Cambridge, Mass., Jun. 9, 1997).

In a form of the present invention, no frequency filtering is applied to the recorded data, thereby retaining the high-energy part of the signal over the entire bandwidth.

Also, in a form of the present invention, processing is independent of the location of the dipole source and receivers in the borehole. This has the advantage that the processing can be applied to data acquired by an eccentered tool. However, the processing requires information on the location of the inline and crossline receivers in the borehole.

This processing hereof does not necessarily assume any particular rock model for the formation. It is, therefore, applicable in the presence of anisotropy caused by aligned fractures or formation stresses, and even in the presence of mechanical alteration in the borehole vicinity.

A form of the technique of the invention includes the following steps:

A. The two-component recorded waveforms ($\mu_{XX}$ and $\mu_{XY}$) are processed by a matrix pencil algorithm (M. P. Ekstrom, Dispersion Estimation From Borehole Acoustic Arrays Using A Modified Matrix Pencil Algorithm, paper presented at the 29th Asilomar Conference On Signlas, Systems, and Computers, Pacific Grove, Calif., Oct. 31, 1995) separately. This algorithm separates dispersive and nondispersive arrivals in each of the two sets of 8 waveforms. In particular, this processing yields the fast and slow bandlimited flexural dispersions. As treated subsequently, the pencil algorithm is able to extract the two principal flexural dispersions from the two-component recorded waveforms ($u_{XX}$ and $u_{XY}$) without any rotation of the recorded waveforms.

B. Small fluctuations in the fast and slow flexural dispersions due to random noise, formation heterogeneity or artifacts are eliminated from the matrix pencil algorithm by carrying out a least-squares fit to the assumed form of the flexural dispersion that extends down to lower frequencies. The low-frequency asymptote of the flexural dispersion yields the formation shear slowness of interest.

C. The fast shear direction is determined by a parametric inversion of recorded waveforms in the frequency domain. Step B ensures a well behaved quadratic objective function for inversion. The details of a new parametric inversion model is described hereinbelow.

In accordance with a form of the invention, a method is set forth for determining formation shear slowness and shear directionality of formations surrounding an earth borehole, comprising the following steps: transmitting into the formations, sonic energy from a dipole source in the borehole; measuring, at each of a plurality of receiver locations in the borehole, spaced at a respective plurality of distances from the transmitter location, signals from orthogonal wave components that have travelled through the formations; transforming the signals to the frequency domain, and separating dispersive and non-dispersive portions of the transformed signals; determining fast and slow shear slownesses of the formation from the low frequency asymptotes of the dispersive portions of the transformed signals; and determining the shear directionality of the formation by parametric inversion of the received signals. In an embodiment of the invention, the step of determining shear directionality by parametric inversion of the transformed frequency domain signals, comprises: deriving an objective function which is a function of the received signals and of model signal values at a model shear directionality; determining the particular model shear directionality that minimizes the objective function; and outputting the particular model shear directionality as the formation shear directionality. In one version of this embodiment, the objective function is a function of differences between a ratio of orthogonal model signal values and a ratio of signals from measured orthogonal wave components. In another embodiment, the objective function is a function of the distance of the measured orthogonal wave components from a subspace derived from orthogonal model signal values.

Further features and advantages of the invention will become more readily apparent from the following detailed description when taken in conjunction with the accompanying drawings.

DETAILED DESCRIPTION

Figure 1:
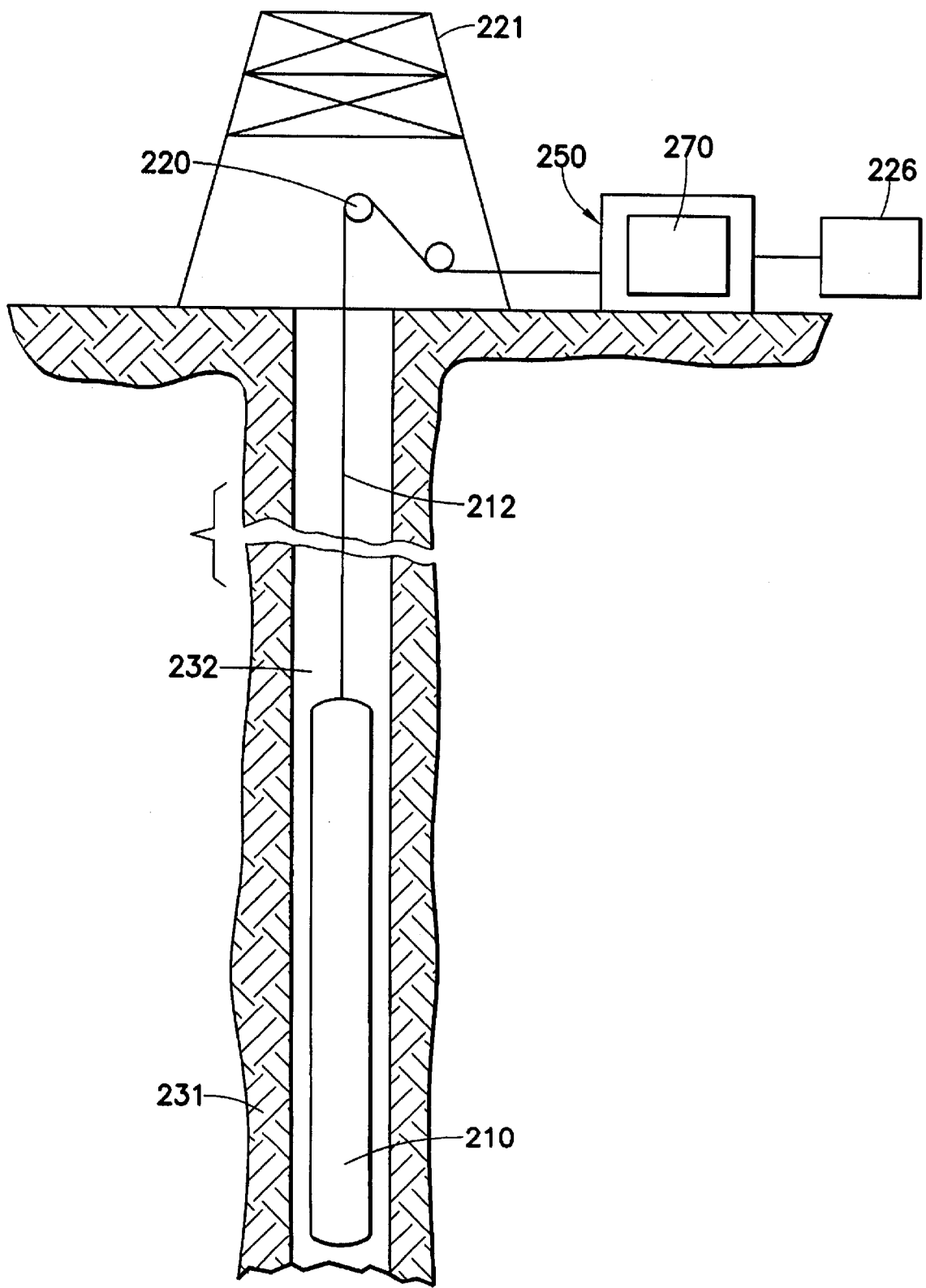
FIG. 1 is a diagram, partially in block form, of a type of apparatus that can be used in practicing embodiments of the invention.

Referring to FIG. 1, there is shown a type of apparatus which can be used in practicing embodiments of the invention. Subsurface formations 231 are traversed by a borehole 232 which is typically, although not necessarily, filled with drilling fluid or mud. A logging tool 210 is suspended on an armored cable 212 and may have optional centralizers (not shown). The cable 212 extends up the borehole, over a sheave wheel 220 on a derrick 221 to a winch forming part of surface equipment 250. Known depth gauging apparatus (not shown) is provided to measure cable displacement over the sheave wheel 220 and accordingly the depth of the logging tool 210 in the borehole 232. A device of a type well known in the art is included in the tool 210 to produce a signal indicative of orientation of the body of the tool 210. Processing and interface circuitry within the tool 210 amplifies, samples and digitizes the tool's information signals for transmission and communicates them to the surface equipment 250 via the cable 212. Electrical power and control signals for coordinating operation of the tool 210 are generated by the surface equipment 250 and communicated via the cable 212 to circuitry provided within the tool 210. The surface equipment includes processor subsystem 270 (which can typically include a microprocessor, memory, clock and timing, and input/output functions—not separately shown), standard peripheral equipment (not separately shown), and recorder 226.

Figure 2:
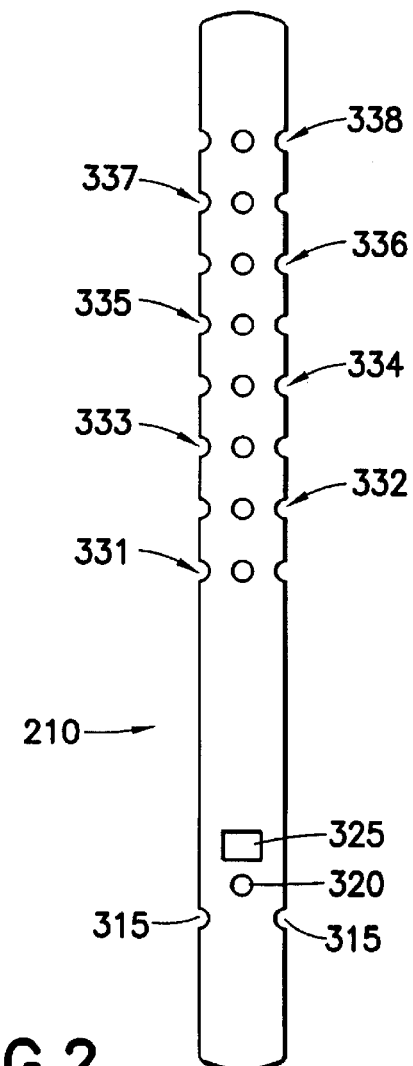
FIG. 2 is a simplified diagram of a type of downhole logging device that can be used in practicing embodiments of the invention.
Figure 3:
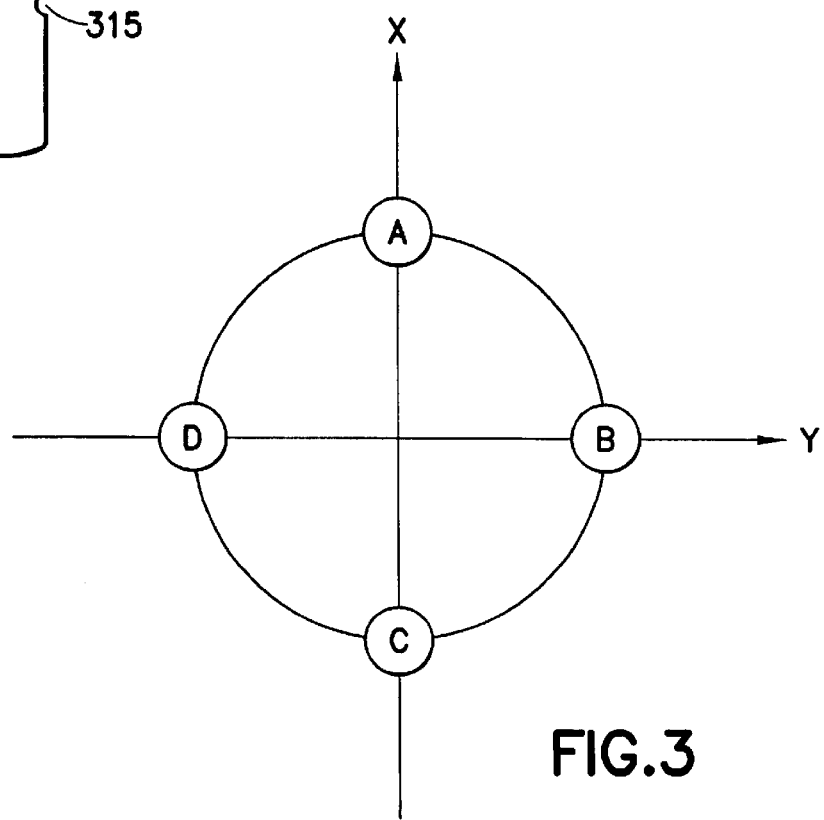
FIG. 3 is a diagram illustrating, in cross-section, the placement of hydrophones that can be used at a receiver station in the logging device of FIG. 2.

The logging device 210 may be, for example, of a type known as a Dipole Shear Sonic Imager ("DSI"—trademark of Schlumberger) generally described in Harrison et al., "Acquisition and Analysis of Sonic Waveforms From a Borehole Monopole and Dipole Source for the Determination of Compressional and Shear Speeds and Their Relation to Rock Mechanical Properties and Surface Seismic Data", Society of Petroleum Engineers, SPE 20557, 1990. It will be understood, however, that any suitable logging device can be utilized. Further details of the logging device 210 of this example are shown in FIG. 2. The logging device 210 includes crossed dipole transmitters 315 and 320 (only one end of dipole 320 being visible) and a monopole transmitter 325, so that waves including compressional, shear, Stoneley, and flexural can be excited. Orthogonal transmitter dipoles are preferred in an embodiment hereof that employs two pairs of transmitter dipoles, but transmitter dipoles at a known non-zero angle that is not a right angle can also be used. [As seen in the illustration, the DSI orthogonal dipole transmitters of this example are not collocated, although they could be. In one of the embodiments hereof, as described below, in which signals from both transmitter dipoles can be used, one of the advantage of the invention is that non-collocated transmitter dipoles are not a meaningful disadvantage as compared to collocated transmitter dipoles.] Eight, or other suitable number, of spaced apart receiver stations, designated 331 through 338 each comprise four receiver hydrophones mounted azimuthally at ninety degree intervals in the surface of the cylindrical logging device. FIG. 3 shows the hydrophones, designated A, B, C, and D. In an example shown in FIG. 4, an X component can be obtained by subtracting the signals received at A and C (i.e., A–C), and a Y component can be obtained by subtracting the signals received at B and D (i.e., B–D). With four receiver elements at each receiver station, there are a total of thirty two receiver elements in this example. The receiver stations are also configurable for monopole reception.

The transmitter electronics contain a power amplifier and switching circuitry capable of driving the two crossed-dipole transmitter elements and the monopole element from a programmable waveform. Separate waveforms with appropriate shape and frequency content can be used for dipole, Stoneley and compressional measurements. The receiver electronics processes the signals from the 32 individual receiver elements located at the eight receiver stations which are spaced six inches apart. At each station, four receivers are mounted as shown in FIG. 3 which allows measurement of the dipole and crossed-dipole waveforms by differencing the outputs from opposite receivers, as previously described. Summing the outputs of the receivers can be used to produce a monopole equivalent signal. As further described in Harrison et al., supra, the receiver electronics multiplexers, filters, amplifies and channels the signals from the 32 receiver elements to eight parallel signal paths. These eight parallel analog signals are passed to an acquisition electronics cartridge where eight 12-bit analog-to-digital converters digitize the signals from the receiver electronics. The telemetry circuitry passes the digitized information to the earth's surface.

Figure 4:
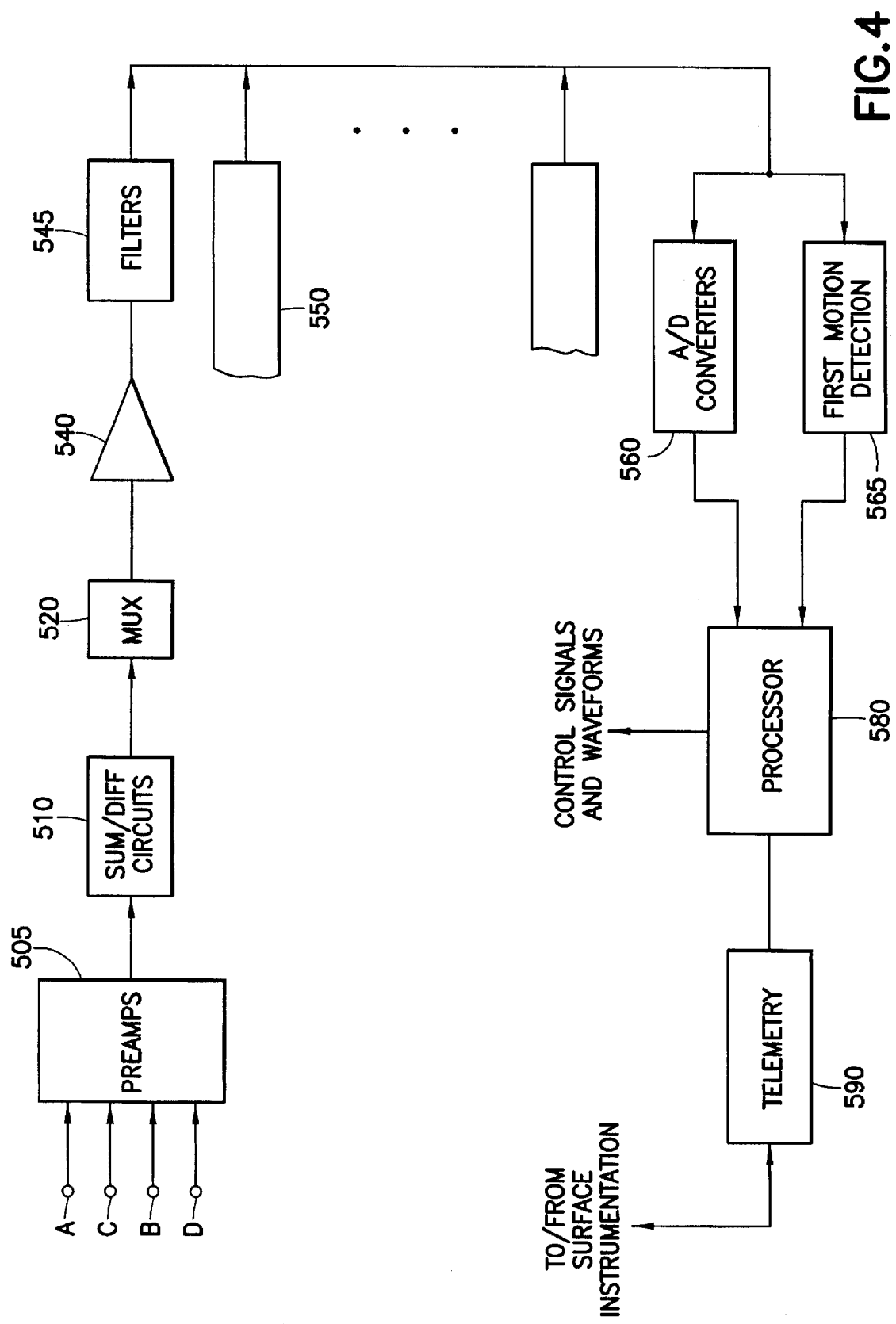
FIG. 4 is a block diagram of a portion of the electronics of the FIG. 2 logging device.

FIG. 4 shows an example of the acquisition signal path in block diagram for for one of the eight (or other suitable number of) receiver stations, as described in Harrison et al., supra. Each receiver has its own charge preamplifier (represented at 505). The output of the receivers, odd numbered pairs being in-line with the upper dipole transmitter and even numbered pairs with the lower dipole transmitter, passes into both a summing circuit (for monopole measurements) and a differencing circuit (for dipole measurements), as represented at 510. Under software control the sum or difference is selected by a multiplexer stage (block 520) and the signal passed to one of eight programmable gain amplifier stages (540) and filters (545). The other similar channels are represented by block 550. The eight parallel analog signals are passed to eight parallel 12-bit A/D converters (represented at 560) where simultaneous waveform digitization is performed. If desired, more bits can, of course, be used to advantage. After digitization, the eight waveforms are passed to the memory section associated with downhole processor 580. The processor also provides control signals and waveforms to transmitter and receiver electronics. An alternate path directs the eight analog receiver signals into threshold crossing detection circuitry or digital first motion detection, as represented at block 565. This circuitry detects the time of all up or down going threshold crossings. The digitized waveform data and the threshold crossing time data are passed to the surface using telemetry circuitry 590. It will be understood that more advanced tool implementations, having additional transmitters, receivers, and/or transmitter-to-receiver (T/R) spacings, and more powerful processing capabilities, can be used even more advantageously, consistent with the principles hereof, in practicing embodiments of the invention.

In the FIG. 2 embodiment, the processing of signals recorded uphole can be implemented using a processor 270, such as a suitably programmed general purpose digital processor with memory and peripherals conventionally provided. It will be understood, however, that the processing need not be performed at the wellsite, and that signals derived at the wellsite can be processed at a remote location. It will also be understood that other suitable logging tools can be employed in practicing the invention.

Figure 5:
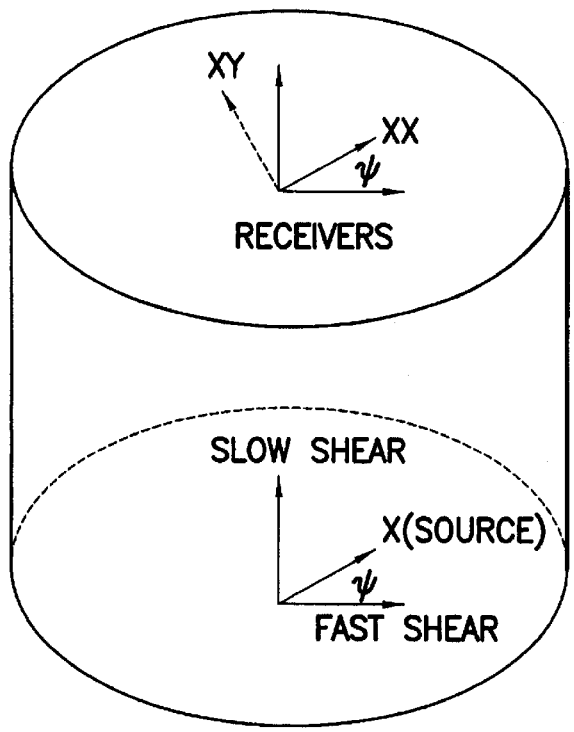
FIG. 5 illustrates shear wave splitting in anisotropic formations and principal polarization directions. A dipole source oriented along the X-direction splits into two shear waves polarized along the fast and slow shear directions. The receiver signals recorded by the receivers XX and XY consist of superposition of the fast and slow shear waves propagating through the anisotropic medium.

Consider a dipole source oriented at an angle $\psi$ with respect to the fast shear direction as shown in FIG. 5. The dipole source waveform can be decomposed into two virtual sources directed along the fast and slow shear directions. The fast and slow flexural waves with corresponding polarization directions propagate along the borehole in accordance with the fast and slow flexural dispersions.

The inline $u_{XX}$ and crossline $u_{XY}$ (data) waveforms contain contributions from both the fast and slow flexural waves. The model representation of the inline and crossline waveforms are denoted by $U_{XX}$ and $U_{XY}$, respectively. The model representation of these waveforms takes the following form $$U_{XX} = S_X \cos^2 \psi G_f + S_X \sin^2 \psi G_s, \quad (1)$$

$$U_{XY} = -S_X \sin \psi \cos \psi G_f + S_X \sin \psi \cos \psi G_s, \quad (2)$$

where $S_X$ is the source signature for a dipole transmitter aligned along the X-direction that makes an angle $\psi$ with the fast shear direction. The eigenfunctions for the pressure field associated with the fast and slow borehole flexural waves can be expressed as $$G_f = -\rho_f \omega^2 J_1(k_r^f r) A^f \cos \phi \exp(j k_z^f z), \quad (3)$$

$$G_s = -\rho_f \omega^2 J_1(k_r^s r) A^f \cos \phi \exp(j k_z^s z), \quad (4)$$

where $$(k_r^{f,s})^2 = \frac{\omega^2}{c_f^2} - (k_z^{f,s})^2, \quad (5)$$

$k_r^{f,s}$ and $k_z^{f,s}$ are the radial wavenumbers in the borehole fluid and axial wavenumbers for the fast and slow flexural waves, respectively, at a given frequency $\omega$. $J_1(x)$ is the Bessel function of first-kind. $\rho_f$ and $c_f$ are the borehole fluid mass density and compressional velocity, respectively. The coordinates r and $\phi$ denote the radial and azimuthal coordinates of the hydrophone receivers.

To cancel the effect of source signature from the analysis, one can construct the ratio $U_{XY}/U_{XX}$ that takes the form $$\frac{U_{XY}}{U_{XX}} = -\cos\psi \sin\psi \frac{J_1(k_r^f r) - J_1(k_r^s r) \exp[j(k_z^s - k_z^f)z]}{\cos^2\psi J_1(k_r^f r) + \sin^2\psi J_1(k_r^s r) \exp[j(k_z^s - k_z^f)z]}. \quad (6)$$

The corresponding quantity from the data is obtained by FFT of the recorded waveforms at each of the eight receivers of the present embodiment. An objective function for the parametric inversion for the fast-shear azimuthal $\psi$ is defined as follows $$F = \sum_\omega \sum_{n=1,8} \left[\frac{U_{XY}}{U_{XX}} - \frac{u_{XY}}{u_{XX}}\right]\left[\frac{U_{XY}}{U_{XX}} - \frac{u_{XY}}{u_{XX}}\right]^*, \quad (7)$$

where * denotes complex conjugate. The objective function is a minimum when the rotated model waveform spectra match with the measured waveform spectra. Under this condition, the rotation angle $\psi$ is obtained that gives the dipole transmitter orientation with respect to the fast shear direction.

In isotropic sections, while the objective function is a minimum for the rotation angle corresponding to the fast-shear direction, it attains a maximum value for a rotation angle 90° from the fast-shear direction. As a result, the difference between the maximum and minimum values of the objective function as a function of rotation angle is an indicator of the magnitude of formation anisotropy. A minimal difference in the objective function for various rotation angles at a given depth implies formation isotropy.

Generally, flexural dispersions obtained from the matrix pencil algorithm do not extend to low frequencies where the flexural velocity approaches the formation shear velocity due to lack of energy at low frequencies. In a form hereof, a reasonable extrapolation can be obtained of the measured flexural dispersion in the intermediate frequency band and below the inflection point by a least-squares fitting of the measured dispersion to the following functional form $$S(f) = S_o(1 + e^{[\beta(f - f_o - \alpha)/f_o]}), \quad (8)$$

where S(f) and $S_o$ are the flexural slownesses at a frequency f ($\geq f_o$) and $f_o$, respectively, $\alpha$ and $\beta$ are two parameters together with $S_o$ that are obtained by least-squares fitting of this functional form to the measured dispersion. $S_o$ is the low-frequency asymptote of the flexural dispersion that yields the formation shear slowness.

Slowness-frequency data from the matrix pencil algorithm may contain more modes than a single flexural mode. In addition, the existence of random noise in the measurement system, formation heterogeneity within receiver array, and processing artifacts from the matrix pencil algorithm may cause random fluctuations in the flexural dispersion together with some isolated points that are far from the main trend of the flexural dispersion. These random fluctuations and isolated points can distort the objective function of the parametric inversion by adding spurious minima. Consequently, in a form hereof, the slowness-frequency data is subjected to a main-trend-detection algorithm for extracting the dominant flexural dispersion. Next, the flexural dispersion data is subjected to a least-squares curve fitting that removes any remaining random fluctuations.

The main-trend detection algorithm operates to discard those points that are far from the dominant dispersion trend. If a mode-order of p=3 is selected in the matrix pencil algorithm, it is possible to have three slownesses at a given frequency. The main-trend detection algorithm includes the following steps:

First, the slowness-frequency data is sorted in the order of increasing frequency. In the user specified slowness-frequency region, there are frequencies where slowness is a multiple-valued function of frequency. This corresponds to different slownesses for zero increments. These slowness-frequency pairs are denoted as $SF_m$ and $SF_s$, respectively. For the i-th frequency in the $SF_m$ group, $f_i$ for instance, all the corresponding slowness values are denoted as $s_{ik}$, with k=1,2, . . . , p, where p is the number of modes that is specified in the matrix pencil algorithm. Next, the frequency $f_j$ in $SF_s$ is located that is smaller than, and closest to $f_i$, and the corresponding slowness is denoted as $S_j$. Then, distances of points ($f_i, s_{ik}$), k=1,2, . . . , p, from ($f_j, s_j$) respectively are examined, and denoted as $d_{ki}$, k=1,2, . . . , p. To make the selection process more reliable, one can calculate distances of ($f_i, s_{ik}$) to a number of successive points in $SF_s$ whose frequencies are smaller than, closest to $f_i$ and sum them up. The following expression summarizes the above process. At the i-th frequency in $SF_m$, $$d_{ik} = \sum_{l=j}^{N_j} \sqrt{(f_i - f_l)^2 + (s_{ik} - s_l)^2}, k = 1, 2, \ldots, p \quad (9)$$

where $N_j$=5 and p=3, in the data processed in an example hereof. For the i-th frequency in $SF_m$, only the slowness-frequency pair that makes $d_{ik}$ the smallest is kept and the other p−1 pairs are discarded.

At this point, the selected slownesses $s_i(f_i)$ are single-valued function of frequency. However, all slownesses may not be on a smooth frequency slowness curve. Hence, one can calculate a difference vector d of neighboring frequency-slowness points defined by $$D_j = \sqrt{(f_j - f_{j-1})^2 + [(s_j - s_{j-1})/s_{max}]^2}, \quad (10)$$

where the index j denotes the frequency index and $s_j$ is the corresponding slowness; $s_{max}$ is the maximum value of slowness in the frequency band of interest. Any value of $D_j$ that exceeds an assumed threshold identifies a particular frequency index J that is discarded from the main flexural dispersion trend. The threshold distance can be selected from a general knowledge of the trend in flexural dispersions for formations being probed. In two examples described herein, the threshold distance Td is defined by the following expression $$Td = \sqrt{(3\Delta f)^2 + (0.15)^2}, \quad (11)$$

where $\Delta f$ is the difference between the consecutive frequency points and 0.15 is the maximum increase allowed in the normalized flexural slowness over the three consecutive frequency points.

It is known that negative slope dispersions are not associated with borehole flexural modes for commonly encountered formations including stress-induced alterations. However, some dispersions from the matrix pencil algorithm may exhibit negative slopes. These negative-slope dispersions may be an artifact of processing by the matrix pencil algorithm in the presence of noise and finite-number of receivers or may represent another neighboring mode of the system that is of no interest in the flexural analysis. Therefore, in an embodiment hereof the frequency-slowness data is low pass filtered and portions with negative slope are discarded. This process does not alter any high-frequency fluctuations that have overall positive-slope trend. This is done to maintain a continuous dispersion for later interpretation. Any remaining high-frequency fluctuations may be eliminated by a parametric curve fitting of the slowness points by equation (8) as previously treated.

Measurement noise and formation heterogeneity within the receiver array also cause isolated points in the fast shear angle as a function of depth from the parametric inversion. Consequently, one may carry out an iterative main-trend-detection process on the fast shear angle versus depth as well. The threshold distance D for discarding the isolated points from the main trend is defined in terms of depth index increment, dn=1 and an angle increment da=4 (degrees). The expression for D is given by $$D = \sqrt{(dn)^2 + (da)^2}, \quad (12)$$

where dn and da are increments in the depth index and maximum allowed increment in angle for neighboring depth, respectively. As treated before, a difference vector is defined as $$Da_j = \sqrt{(d_j - d_{j-1})^2 + (a_j - a_{j-1})^2}. \quad (13)$$

where the index $d_j$ denotes the depth index, $d_j - d_{j-1}$=dn=1; and $a_j$ is the corresponding fast-shear angle measured from the inline receiver orientation. Any value of $Da_j$ that exceeds an assumed threshold value D defined by equation (12) indicates the depth index j that is discarded along with the corresponding fast-shear angle.

Finally, a depth averaging is applied over the array length of 3.5 ft on both the slowness and angle versus depth logs.

Consider the case of an orthorhombic formation with the X3-axis parallel to the borehole axis. The elastic constants referred to the borehole axes for an orthorhombic formation takes the form $$C = \begin{bmatrix} c_{11} & c_{12} & c_{13} & 0 & 0 & 0 \\ c_{12} & c_{22} & c_{23} & 0 & 0 & 0 \\ c_{13} & c_{23} & c_{33} & 0 & 0 & 0 \\ 0 & 0 & 0 & c_{44} & 0 & 0 \\ 0 & 0 & 0 & 0 & c_{55} & 0 \\ 0 & 0 & 0 & 0 & 0 & c_{66} \end{bmatrix},$$

where the nine independent elastic moduli are $c_{11}$, $c_{12}$, $c_{13}$, $c_{22}$, $c_{23}$, $c_{33}$, $c_{44}$, $c_{55}$, and $c_{66}$.

Figure 6:
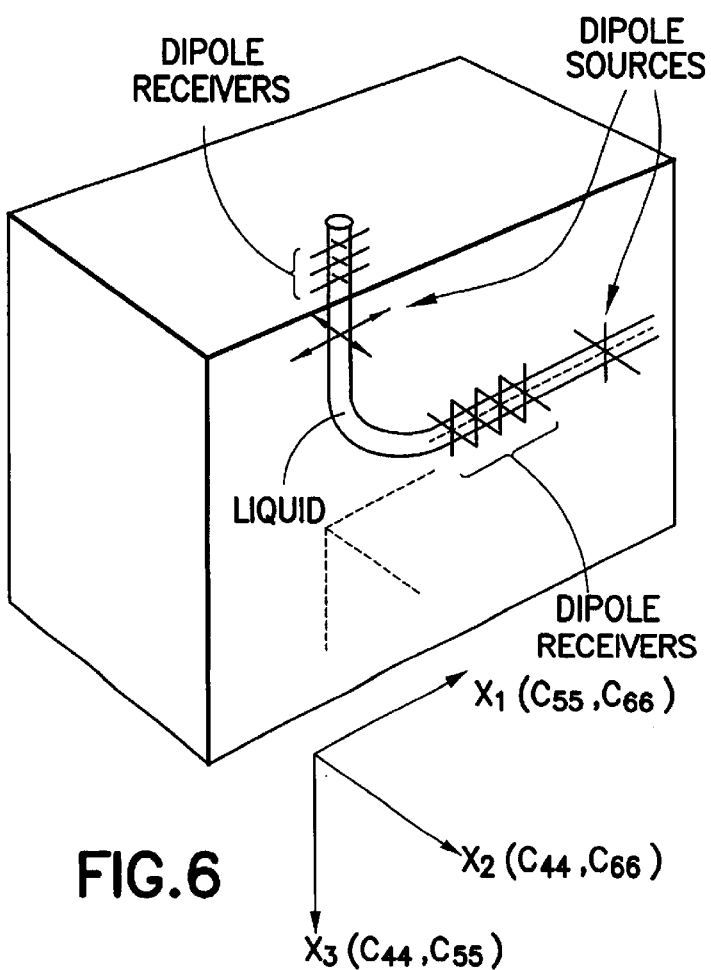
FIG. 6 is a schematic diagram of a vertical and horizontal sections of a well together with the measurement axes. $c_{44}$ and $c_{55}$ are the shear moduli that can be obtained from the dipole shear logging in a borehole with its axis parallel to the $X_3$-axis.

FIG. 6 shows a schematic diagram of a vertical well with the $X_3$-axis parallel to the borehole, and a horizontal section of the well with the $X_1$-axis parallel to the borehole. A dipole source in such a borehole can generate two principal flexural waves. Low-frequency asymptotes of these two flexural dispersions yield the two shear velocities that provide two of the three shear moduli of the formation. As indicated in FIG. 6, $c_{44}$, and $c_{55}$ are the two shear moduli that can be obtained from the fast and slow dipole flexural dispersions. The low-frequency asymptotes of the fast and slow flexural dispersions provide the fast ($V_{Fast}$) and slow ($V_{slow}$) shear velocities of the formation, respectively. The two shear moduli in the orthogonal sagittal planes of the measurement can then be obtained from the relationships $$c_{44} = \rho_s V_{Fast}^2, \text{ and } c_{55} = \rho_s V_{Slow}^2, \qquad (14)$$

where $\rho_s$ is the formation mass density at a given depth.

In the next section hereof, the two-component processing technique of an embodiment hereof is applied to two sets of field data acquired by the type of logging device first described above. The existing four-component processing algorithm uses the four receiver waveforms $u_{XX}$, $u_{XY}$, $u_{YY}$, and $u_{YX}$, at seven receiver stations and subjects them to Alford rotation. The first index X refers to the dipole source direction and the second index Y refers to the receiver direction. The Alford rotation algorithm yields the orientation of the fast and slow shear directions. The recorded waveforms are rotated to align with the fast and slow shear directions.

The rotated waveforms are then time windowed to include the first two-cycles and subjected to semblance processing that yields the fast and slow shear slownesses (see U.S. Pat. No. 5,587,966).

The described two-component processing algorithm uses the two-receiver waveforms $u_{XX}$ and $u_{XY}$ at eight receiver stations from a single dipole source oriented in the X-direction.

Figure 7:
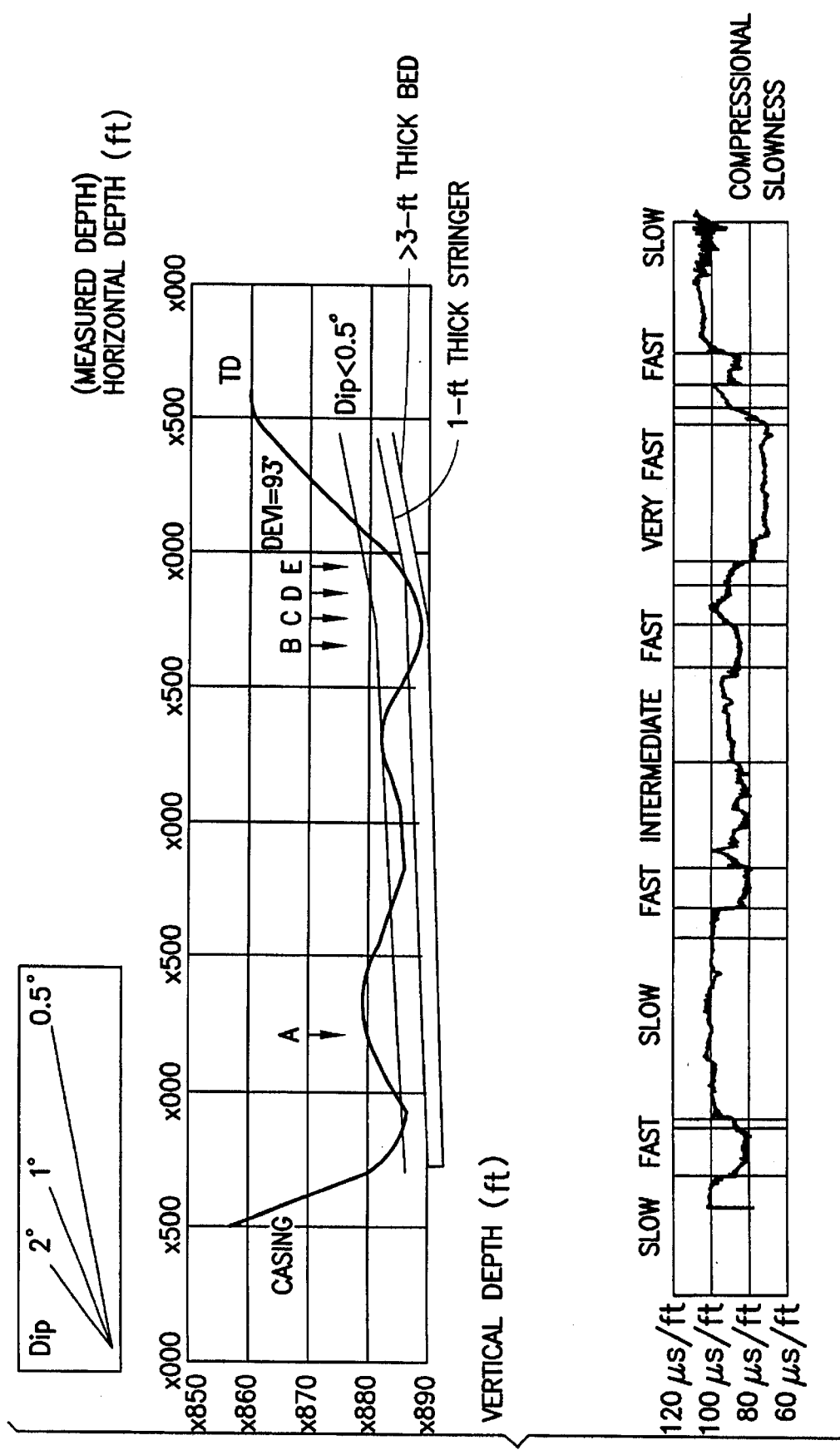
FIG. 7 shows a well cross-section (well-A) of a well trajectory based on logs from equipment such as a DSI. The arrows at A, B, C, D, and E refer to depths x200, x744, x754, x850, and x904 ft respectively. The lower panel plots compressional slowness.

First, a limestone reservoir will be considered. As background note that dipole sonic logging tools can measure azimuthal anisotropy in the surrounding formation (see C. Esmersoy, K. Koster, M. Williams, A. Boyd and M. Kane, Dipole Shear Anisotropy Logigng, 64$^{th}$. Ann. Internat. Mtg., Soc. Expl. Geophys, Expanded Abstracts, 1139–1142, 1994); M. Mueller, A. Boyd and C. Esmersoy, Case studies of the dipole shear anisotropy log, 64$^{th}$ Ann. Internat. Mtg., Soc. Expl. Geophys., Expanded Abstracts, 1143–1146, 1994. FIG. 7 shows the cross section of a horizontal well trajectory in a limestone reservoir (Well-A) together with the identification of a 1-ft thick stringer and a 3-ft thick bed. As described for example in B. K. Sinha, M. R. Kane, and B. Frignet, "Case History: Dipole Dispersion Crossover And Sonic Logs In A Limestone Reservoir", Geophysics, Vol. 65, No. 2, pp. 390–407, March–April 2000, compressional log consistently shows lower compressional and shear slownesses wherever the well penetrates these low-porosity stringers. The borehole diameter in this example is approximately 6.3 inches. The well trajectory is approximately horizontal with dips ranging less than 1° over a 2000-ft section). Consequently, the overburden stress is approximately perpendicular to the entire section of the horizontal well treated herein.

Figure 8B:
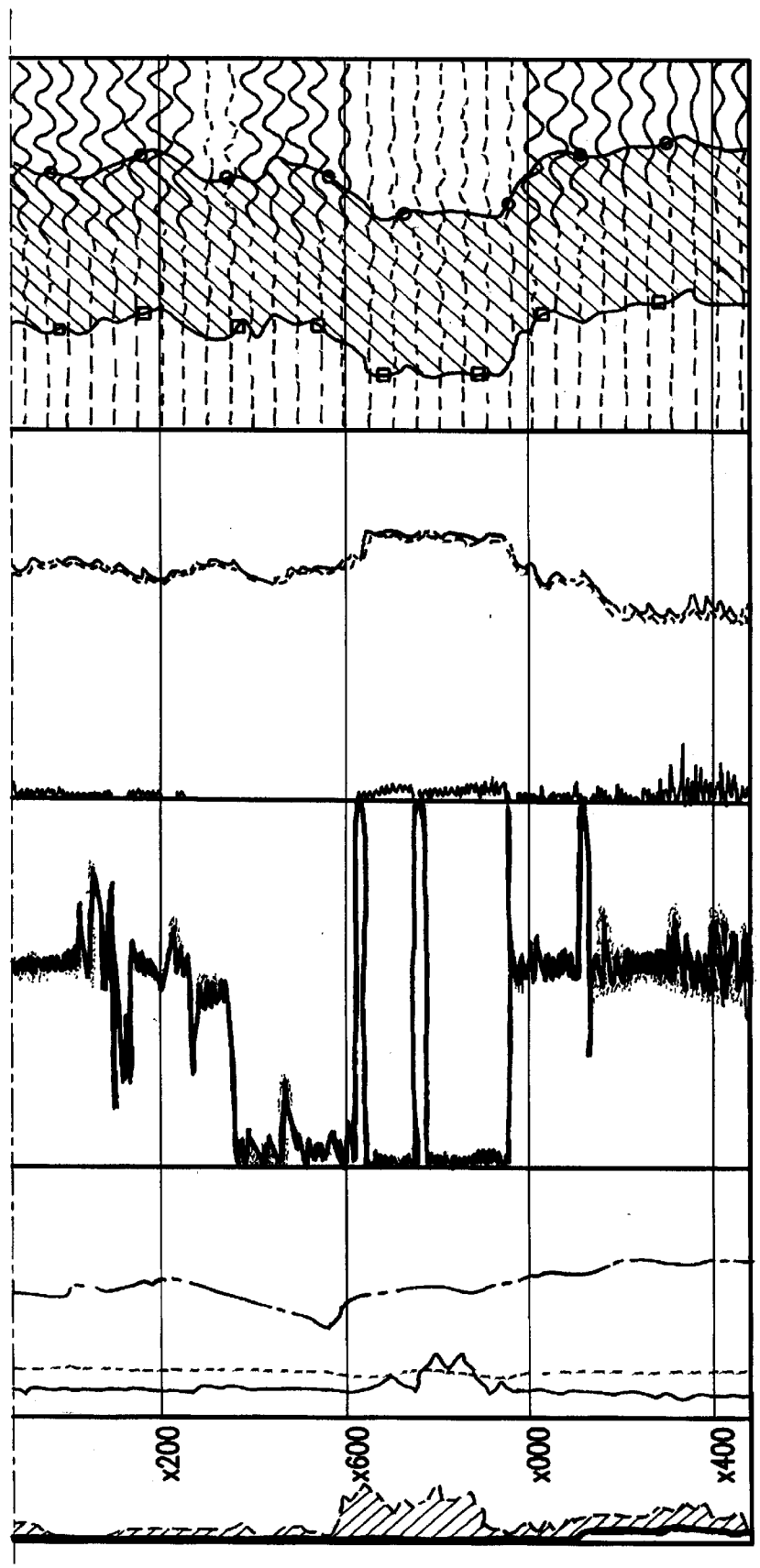
FIG. 8 shows DSI logs in horizontal Well-A. Next to the depth track, the panel contains gamma ray, relative bearing of the inline dipole source (dashed line), and hole deviation from the horizontal. The next three panels, respectively, show the fast shear azimuth, the fast and slow shear logs, and the processing window used to obtain them.

FIG. 8 is a summary of the log obtained from DSI data in horizontal Well-A. Next to the depth track, the panel shows, from left to right, gamma ray, relative bearing of the inline source with respect to the vertical, and hole deviation logs. The next three tracks, respectively, show the fast shear azimuth obtained by Alford rotation of the dipole waveforms; the fast and slow shear logs; and the processing window used to obtain them. The gamma ray log is quite uniform over the entire interval except in the 3-ft thick bed. The relative bearing is approximately 35 to 40 degrees from the vertical. The small shear anisotropy in a limestone reservoir is to be expected because of the small stress-induced effects in such fast formations.

Figure 9:
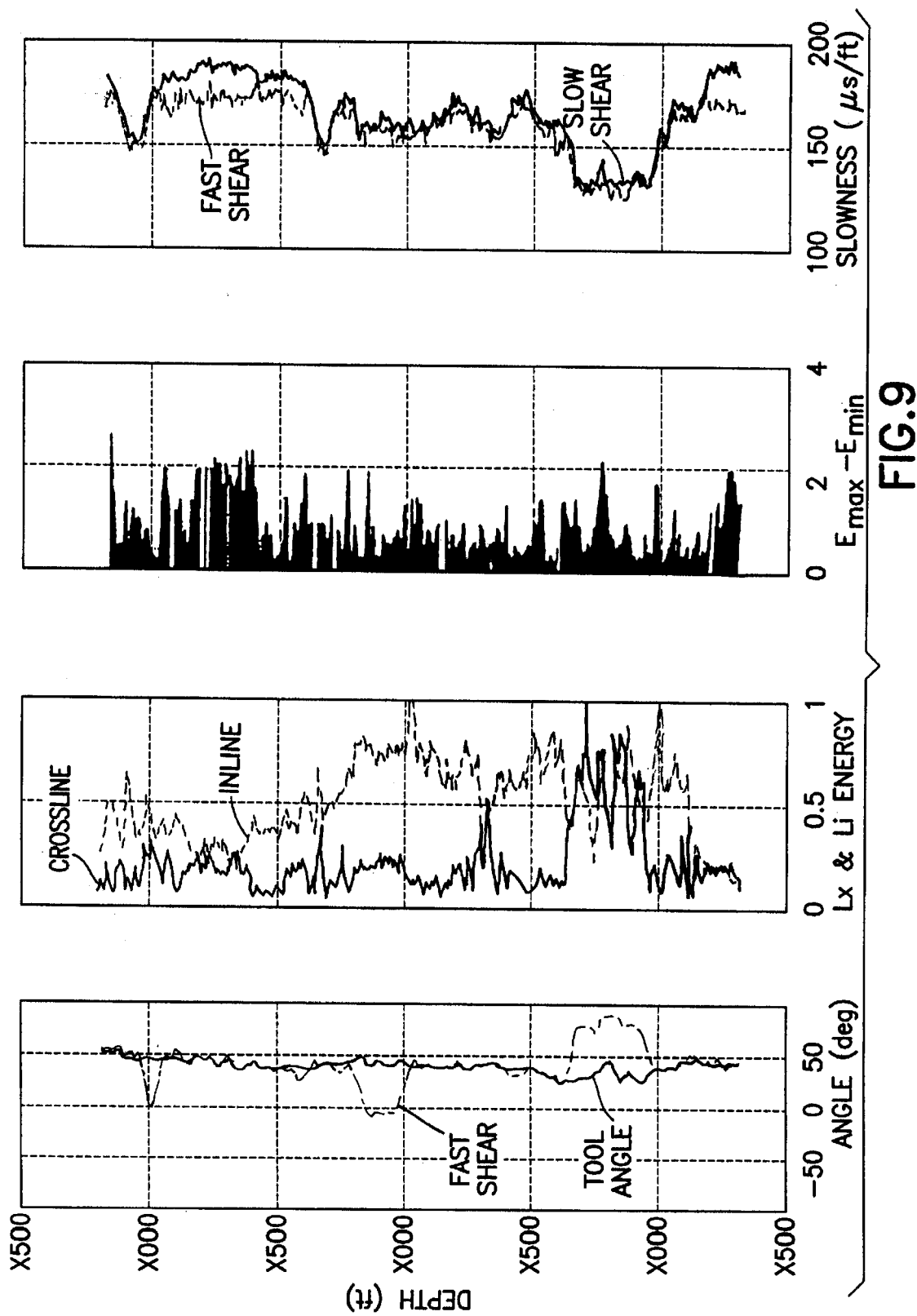
FIG. 9 shows results of processing in accordance with an embodiment of the invention. The first panel shows the fast shear direction measured from the north (or vertical) direction as the reference. The tool orientation is also referred to the north (or vertical) direction as the reference. The second panel displays the energy in the inline and crossline receivers. The third panel displays differences in the maxima and minima of errors in the parametric inversion as a function of depth. The fourth panel shows the fast and slow shear slownesses obtained by the processing hereof. Results are for a vertical well in a limestone formation.

FIG. 9 displays the results of the processing using a form hereof. The first panel (going left to right) shows the fast shear direction together with the tool orientation measured from the vertical direction as the reference. The fast shear direction is obtained by the above-mentioned parametric inversion model.

The second panel shows the relative distribution of energy in the inline and crossline receivers. In the presence of formation anisotropy, the relative magnitudes of energy in the inline and crossline receivers are comparable. However, a large difference in the inline and crossline receiver energies may indicate either formation isotropy or anisotropy where the inline and crossline receivers happen to be aligned essentially with the principal anisotropy directions.

The third panel displays differences between the maxima and minima of the objectivity function as a function of azimuth at various depths. Large differences in such cost function minimization errors at two orthogonal azimuths indicate formation anisotropy. On the other hand, negligible differences between the maxima and minima as a function of azimuth imply formation isotropy. Note that the minimum difference that is seen in an apparent isotropic section of the well is an indicator of intrinsic noise in the processed output.

The fourth panel displays the fast and slow shear slownesses obtained by a parametric extrapolation of the measured dispersions from the inline and crossline receiver waveforms. The slownesses shown in the log are obtained at frequencies that are approximately between 2 and 3 kHz. Theoretical calculations of flexural dispersions indicate that flexural slownesses at these frequencies are the relevant formation shear slownesses for the range of formation parameters and borehole diameter at hand.

The results from the two different processing techniques are in general agreement with each other except in the top section of the well where the results of the processing technique hereof show somewhat larger anisotropy than the existing processing algorithm.

Next, a granite formation is considered. This example deals with a granite formation that has faults resulting in a fractured system over a certain section of a vertical well. Dipole flexural probe was used to detect the fault-induced fractures together with other sonic techniques, such as Stoneley wave attenuation and reflection. In this section, the results of the two-component processing of an embodiment of the invention are described. The objectives of the dipole shear anisotropy measurements are to estimate the fast-shear direction and the fast and slow shear slownesses as a function of depth.

The radial polarization of the fast shear wave aligns with the fracture orientation and the difference between the fast and slow shear slownesses is related to the tangential compliance of the fractured system (M. Schoenberg and C. M. Sayers, Seismic Anisotropy Of Fractured Rock, Geophysics, (60), 204–211. 1995). The section of the well exhibiting fault-induced fractures are important to locate because these sections contribute significantly t o the hydrocarbon production volume.

Figure 10:
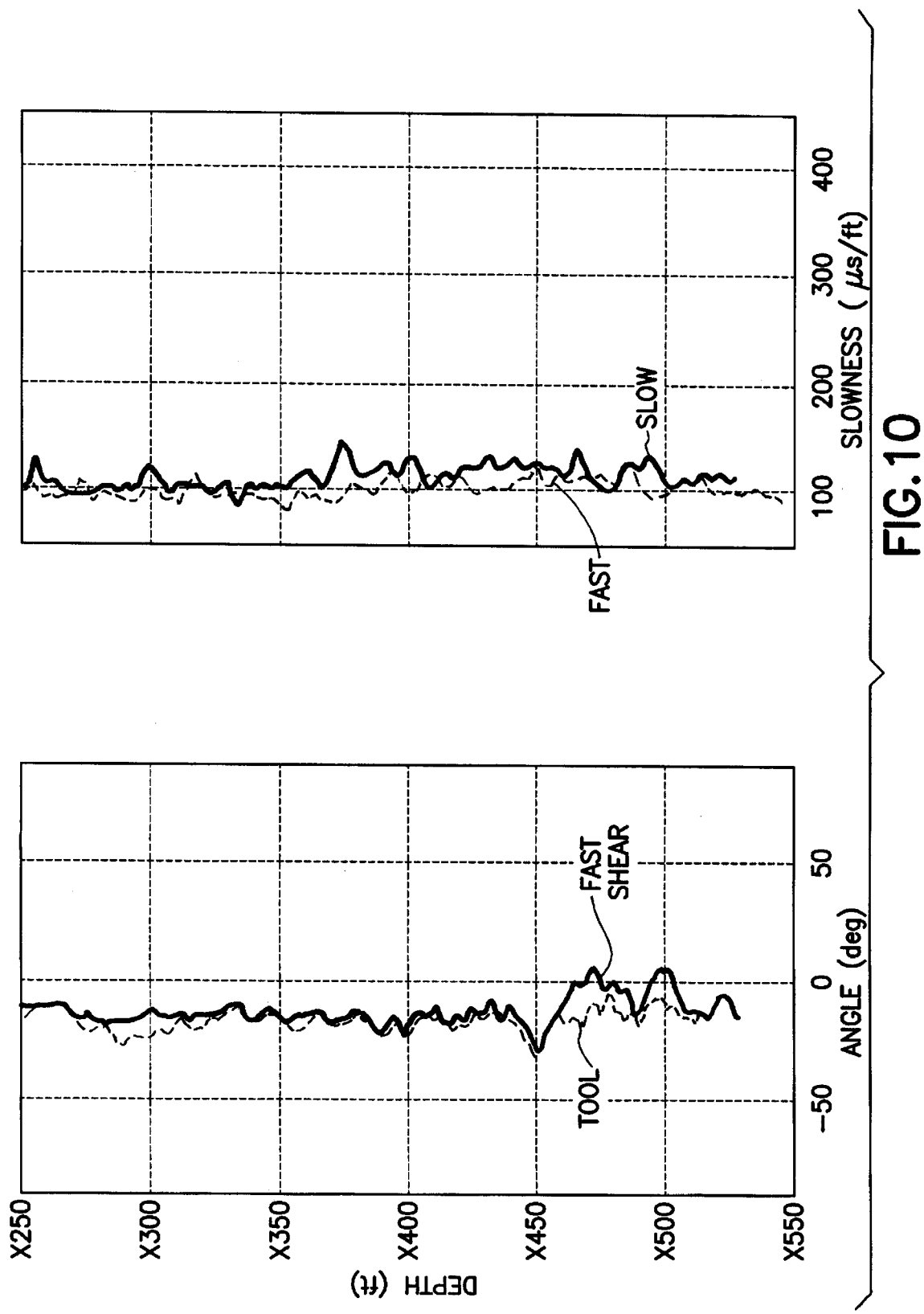
FIG. 10 shows results of the processing of an embodiment hrereof. The first (leftmost) panel shows the fast shear direction together with the tool orientation measured from the north direction as the reference. The second panel displays the fast and slow shear slownesses as a function of depth. Results are for a vertical well in a granite formation.

FIG. 10 displays the fast shear direction obtained by a form hereof using parametric inversion of the two-component data collected by the DSI tool in a granite formation. Both the fast shear and tool orientations are measured from the north direction. A positive rotation,is taken to be from north to east. The second panel shows the fast and slow shear slowness logs obtained by a parametric extrapolation of the measured dispersions obtained by the previously referenced matrix pencil algorithm (M. P. Ekstrom, Dispersion Estimation From Borehole Acoustic Arrays Using A Modified Matrix Pencil Algorithm, paper presented at the 29$^{th}$ Asilomar Conference on Signals, Systems, and Computers, Pacific Grove, Calif., Oct. 31, 1995).

Figure 11:
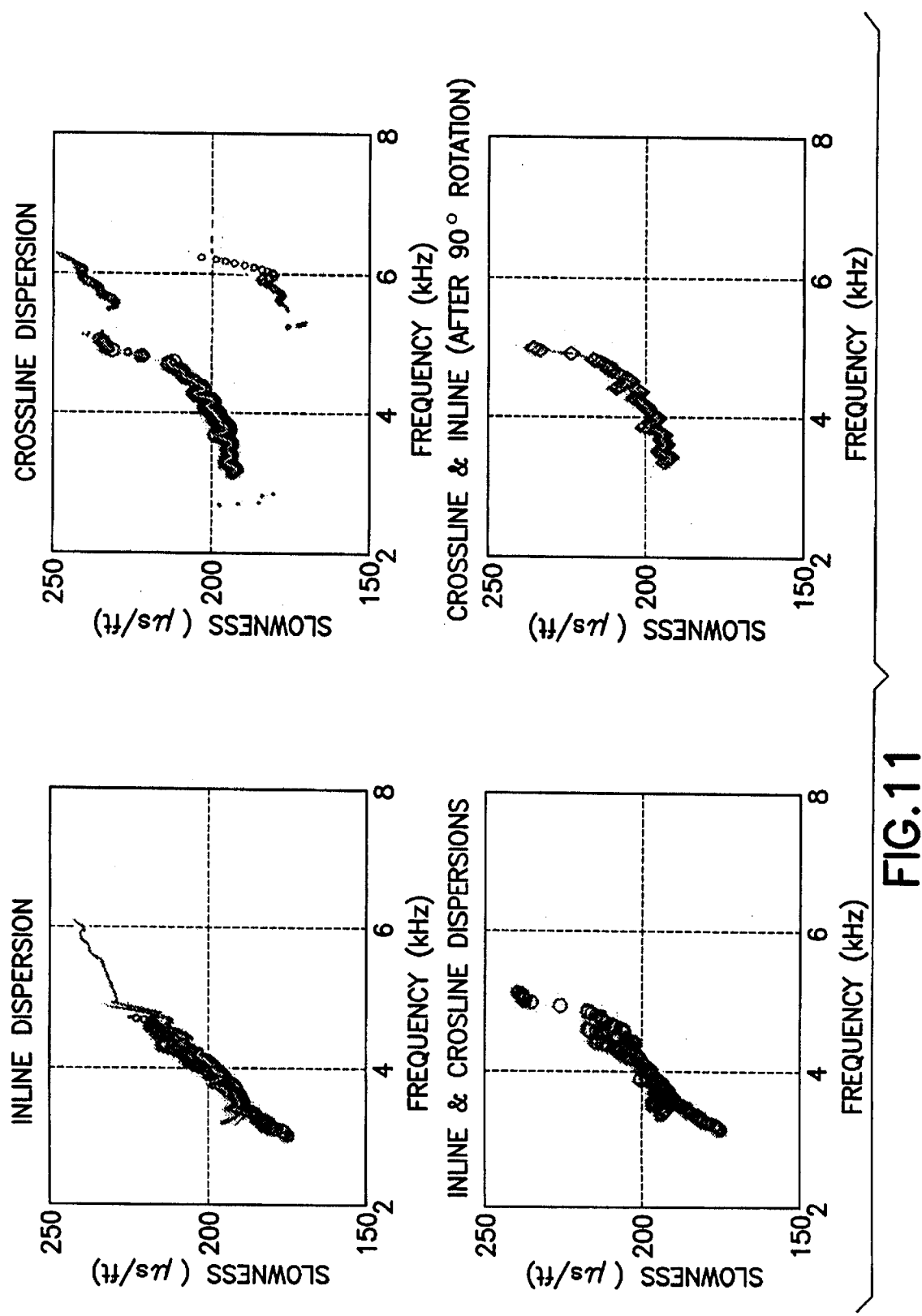
FIG. 11 illustrates dispersions from unrotated and rotated inline and crossline waveforms: The upper two subplots show a superposition of flexural dispersions obtained from the inline and crossline waveforms after rotating them by 10°, 20°, 30°, 40°, 50°, 60°, 70° and 80°. The lower left subplot shows a superposition of the fast and slow flexural dispersions, which exhibit a dispersion crossover. The lower right subplot shows a superposition of flexural dispersions obtained from inline waveforms after rotating by 90° from the fast shear direction and the original crossline waveforms.

To validate the showing that the fast and slow flexural dispersions can be retrieved from any angular orientations of inline and crossline receivers, we rotate the recorded waveforms by different angles and obtain the flexural dispersion from the matrix pencil algorithm (M. P. Ekstrom, Dispersion Estimation From Borehole Acoustic Arrays Using A Modified Matrix Pencil Algorithm, paper presented at the 29$^{th}$ Asilomar Conference on Signals, Systems, and Computers, Pacific Grove, Calif., Oct. 31, 1995). The relevant orthogonal transformation of the recorded waveforms, $u_{XX}$ and $u_{XY}$, is carried out according to the following relationship $$\begin{bmatrix} u'_{XX} \\ u'_{XY} \end{bmatrix} = \begin{bmatrix} \cos^2\psi' & \sin^2\psi' \\ -\cos^2\psi'\sin^2\psi' & \cos\psi'\sin\psi' \end{bmatrix} \begin{bmatrix} \cos^2\psi & \sin^2\psi \\ -\cos\psi\sin\psi & \cos\psi\sin\psi \end{bmatrix}^{-1} \begin{bmatrix} u_{XX} \\ u_{XY} \end{bmatrix}, \quad (15)$$

where $\psi$ is the fast shear azimuth and $\psi'$ is the angle to which the waveforms are rotated with respect to the inline receiver direction. $u_{XX}$ and $u_{XY}$ are recorded inline and crossline waveforms $u'_{XX}$ and $u'_{XY}$ are the waveforms after rotation. The rotated waveforms are then subjected to the matrix pencil algorithm for obtaining the flexural dispersions. The upper left panel of FIG. 11 shows a superposition of flexural dispersions obtained from the inline waveforms $u_{XX}$ at a selected depth of a limestone reservoir after rotating them by 10°, 20°, 30°, 40°, 50°, 60°, 70° and 80° from the fast shear direction. At this measured depth of this horizontal well, there is an evidence of stress-induced dispersion crossover with the fast-shear being in the vertical direction. The upper right panel of FIG. 11 displays a corresponding plot of flexural dispersions obtained from the crossline receivers after rotating them by 10°, 20°, 30°, 40°, 50°, 60°, 70° and 80°. The lower left panel of FIG. 11 shows a superposition of flexural dispersions from the inline and crossline waveforms. These two inline and crossline dispersions exhibit a dispersion crossover. When the inline-receiver waveforms are rotated by 90°, the resulting dispersion corresponds to the dispersion from the original crossline waveforms and a superposition of these results are shown on the lower right panel of FIG. 11. These results confirm that the two principal flexural dispersions can be obtained from any combination of inline and crossline waveforms without any frequency filtering and rotation.

Next, a further embodiment of the invention is described, which employs a different algorithm. The working equations for the model of the dipole components in an anisotropic formation, as follow from equations (1) and (2) above, are:

$$U_{xx} = S_x[G_f \cos^2(\psi) + G_s \sin^2(\psi)]$$

$$U_{xy} = S_x[-G_f \cos(\psi)\sin(\psi) + G_s \cos(\psi)\sin(\psi)]$$

$$U_{yx} = S_y[-G_f \cos(\psi)\sin(\psi) + G_s \cos(\psi)\sin(\psi)]$$

$$U_{yy} = S_y[G_f \sin^2(\psi) + G_s \cos^2(\psi)] \quad (16)$$

where $S_x$, $S_y$ are the source signatures, $$G_f = \rho_f \omega^2 J_1(k_r^f r) A^f \cos(\phi) \exp(jk_z^s z)$$

$$G_s = \rho_f \omega^2 J_1(k_r^s r) A^f \cos(\phi) \exp(jk_z^s z) \quad (17)$$

and $$(k_r^{f,s})^2 = \frac{\omega^2}{c_f^2} - (k_z^{f,s})^2$$

with $c_f$ as the borehole fluid speed.

In a prior embodiment hereof, the source signatures are eliminated from the problem by taking the ratio, e.g., $U_{xy}/U_{xx}$ (see equation (6) above. Moreover it was assumed that there is available a scheme for estimating ng the wavenumber dispersion $k_z^{f,s}$ from the data (based, for example, on the method described of Ekstrom, see e.g. "Dispersion Estimation From Borehole Acoustic Arrays Using A Modified Matrix Pencil Algorithm," Paper Presented at the ti 29$^{th}$ Asilomar Conference On Signals, Systems, and Computers, Pacific Grove, Calif., 1995). In the present embodiment, similar assumptions are made, but another route is taken to eliminating the source signatures. First, the case for two components say $U_{XX}$ and $U_{XY}$ is solved. Later, it can be seen that it generalizes to the case of four components.

Using equations (16), one can write $$\begin{bmatrix} U_{xx} \\ U_{xy} \end{bmatrix} = -\rho_f \omega^2 S_x A^f \cos(\phi) \begin{bmatrix} B_f & 0 & B_s \\ 0 & B_s - B_f & 0 \end{bmatrix} \begin{bmatrix} \cos^2(\psi) \\ \cos(\psi)\sin(\psi) \\ \sin^2(\psi) \end{bmatrix} \quad (18)$$

where $$B_f = J_1(k_r^f r) \exp(jk_z^f z)$$

$$B_s = J_1(k_r^s r) \exp(jk_z^s z) \quad (19)$$

It can be noted that this equation represents the model at a particular frequency w and a specific sensor location z relative to a reference, usually the transmitter. For a sonic logging tool, sensors are located at a set of axial locations $\{z_1, z_2, \ldots z_M\}$. The above model can be consolidated for all the array data as follows.

$$K_x(\omega) = -\rho_f \omega^2 S_x(\omega) A^f \cos(\phi) \quad (20)$$

$$\underline{U_{xx}}(\omega) = \begin{bmatrix} U_{xx}(\omega, z_1) \\ U_{xx}(\omega, z_2) \\ \vdots \\ U_{xx}(\omega, z_M) \end{bmatrix}; \underline{U_{xy}}(\omega) = \begin{bmatrix} U_{xy}(\omega, z_1) \\ U_{xy}(\omega, z_2) \\ \vdots \\ U_{xy}(\omega, z_M) \end{bmatrix} \quad (21)$$

$$\underline{B}_f^X(\omega) = \begin{bmatrix} B_f(\omega, z_1) \\ B_f(\omega, z_2) \\ \vdots \\ B_f(\omega, z_M) \end{bmatrix}; \underline{B}_s^X(\omega) = \begin{bmatrix} B_f(\omega, z_1) \\ B_f(\omega, z_2) \\ \vdots \\ B_f(\omega, z_M) \end{bmatrix} \quad (22)$$

$$V(\psi) = \begin{bmatrix} \cos^2(\psi) \\ \cos(\psi)\sin(\psi) \\ \sin^2(\psi) \end{bmatrix} \quad (23)$$

where the superscript in $\underline{B}_f^X(\omega)$ and $\underline{B}_s^X(\omega)$ is used to emphasize that the sensor locations used to calculate the elements from equation (19) are taken with respect to the X transmitter (and may be different from that with respect to the Y transmitter if the two transmitters are not collocated axially). One then gets:

$$\begin{bmatrix} \underline{U}_{xx}(\omega) \\ \underline{U}_{xx}(\omega) \end{bmatrix} = K_x(\omega) \begin{bmatrix} \underline{B}_f^X(\omega) & 0 & \underline{B}_s^X(\omega) \\ 0 & \underline{B}_s^X(\omega) - \underline{B}_f^X(\omega) & 0 \end{bmatrix} V(\psi) \quad (24)$$

Then, writing $$\underline{U}_x = \begin{bmatrix} U_{xx}(\omega) \\ U_{xy}(\omega) \end{bmatrix}; \underline{B}^X = \begin{bmatrix} \underline{B}_f^X(\omega) & 0 & \underline{B}_s^X(\omega) \\ 0 & \underline{B}_s^X(\omega) - \underline{B}_f^X(\omega) & 0 \end{bmatrix} \quad (25)$$

one can obtain the compact expression $$\underline{U}_x = K_x \underline{B}^x V(\psi) \quad (26)$$

where the dependence on ω has been suppressed. Here, the model has been expressed in terms of quantities separated on the basis of their dependency. The first term on the right, $K_x$, contains the unknown frequency dependent source excitation, $S_x$, as well as other quantities which are fixed at any given frequency. The second term $\underline{B}^x$ is dependent on the dispersion characteristic of the mode and can be pre-computed once that is known or estimated. Finally, the last term contains the dependence on the angle to be estimated, $\psi$.

This model can be solved as a least squares (LS) problem with $K_x$ as the linear parameter and $\psi$ as the non-linear parameter (if the wave numbers have to be estimated, those are also non-linear parameters). The linear parameter can be estimated in closed-form and eliminated from the problem, leaving an optimization only over the non-linear parameter.

Equation (26) has been expressed at a particular frequency ω. The received data samples can be Fourier transformed (e.g. FFT) to generate samples in the frequency domain at a set of bin frequencies $\{\omega_1, \omega_2, \ldots, \omega_K\}$ in a processing band. These samples are denoted by $\underline{u}_{xx}(\omega_k)$, $\underline{u}_{xy}(\omega_k)$, k=1, ..., K, where each is a vector constructed from the data from all the sensors at that frequency as follows:

$$\underline{u}_{xx} = \begin{bmatrix} U_{xx}(\omega, z_1) \\ U_{xx}(\omega, z_2) \\ \vdots \\ U_{xx}(\omega, z_M) \end{bmatrix}; \underline{u}_{xy} = \begin{bmatrix} U_{xy}(\omega, z_1) \\ U_{xy}(\omega, z_2) \\ \vdots \\ U_{xy}(\omega, z_M) \end{bmatrix} \quad (27)$$

Also writing $$\underline{u}_x = \begin{bmatrix} \underline{u}_{xx} \\ \underline{u}_{xy} \end{bmatrix} \quad (28)$$

one obtains the LS problem $$\min_{\psi, K_x} \sum_{\omega_k} \|\underline{u}_x(\omega_k) - K_x(\omega_k) \underline{B}^X(\omega_k) V(\psi)\|^2 \quad (29)$$

The $K_x$ can be eliminated by solving for it at each frequency in closed form given $\psi$. Let $$D_\psi^X(\omega_k) = \underline{B}^X(\omega^k) V(\psi) \quad (30)$$

then $$\hat{K}_s(\omega_k) = [D_\psi^X(\omega_k)' D_\psi^X(\omega_k)]^{-1} D_\psi^X(\omega_k)' \underline{u}_x(\omega_k) \quad (31)$$

for all $\omega_k$, k=1, ..., K.

Substituting into equation (29), the least squares criterion to be minimized over the angle $\psi$ is obtained:

$$\min_\psi c(\psi) = \quad (32)$$

$$\min_\psi \sum_{\omega_k} \|\underline{u}_x(\omega_k)\|^2 - \left\| D_\psi^X(\omega_k) [D_\psi^X(\omega_k)' D_\psi^X(\omega_k)]^{-1} D_\psi^X(\omega_k)' \underline{u}_x(\omega_k) \right\|^2$$

where it is noted that only the second term involves the test angle $\psi$ and needs to be minimized.

The solution to this problem requires a 1-D optimization over a limited interval $$[-\frac{\pi}{2}, \frac{\pi}{2}]$$

since the criterion is periodic over π. The convergence is quick as the criterion is well-behaved as a function of the test angle $\psi$.

This approach can be extended to four components by augmenting the criterion $c(\psi)$ to include a similar expression involving the Y dipole data $\underline{u}_{yy}$ and $\underline{u}_{yx}$. The modeled 1-D subspace $D_\psi^Y(\omega_k)$ for the data from the Y transmitter likewise has to be modified to incorporate the distance of the sensors from the Y transmitter in the computation of the elements of the corresponding $\underline{B}^Y$ matrix (as in equation (19) The least squares minimization for this case is:

$$\min_\psi c(\psi) = \min_\psi \sum_{\omega_k} -\left\| D_\psi^X(\omega_k) [D_\psi^X(\omega_k)' D_\psi^X(\omega_k)]^{-1} D_\psi^X(\omega_k)' \underline{u}_x(\omega_k) \right\|^2 - \quad (33)$$

$$\left\| D_\psi^Y(\omega_k) [D_\psi^Y(\omega_k)' D_\psi^Y(\omega_k)]^{-1} D_\psi^Y(\omega_k)' \underline{u}_y(\omega_k) \right\|^2$$

where only the $\psi$ dependent terms have been retained in the criterion. Though this criterion uses both transmitters it can be noted that no assumptions are made about the matching of these transmitters. In particular, these are not required to be collocated (or depth shifted), orthogonal, or excited with matched source pulses.

Figure 12:
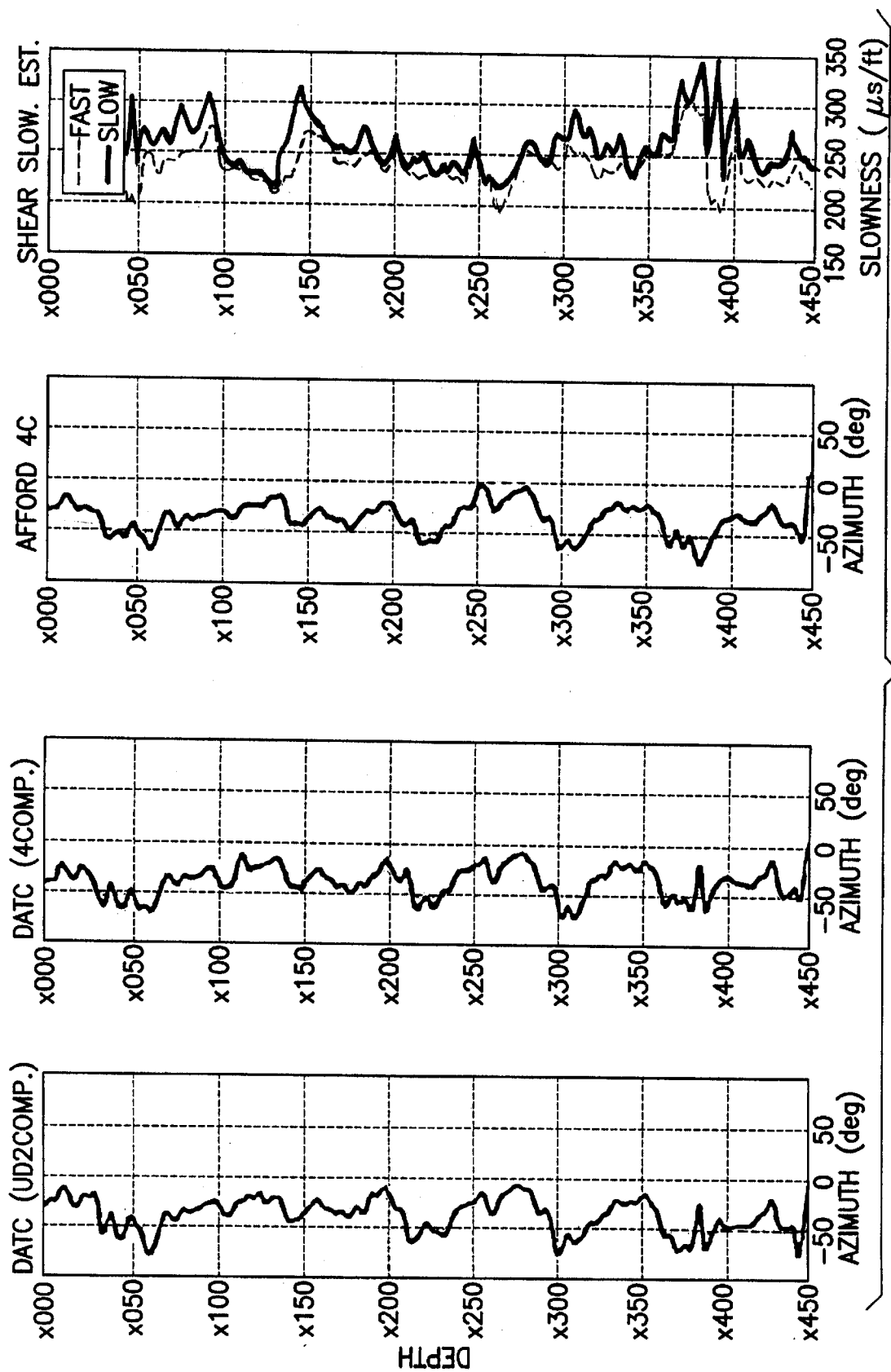
FIG. 12 shows a comparison of methods for estimating the fast shear azimuth in a medium slow formation. The estimates obtained with the technique of a further embodiment hereof using only two dipole components, inline and cross-line from one transmitter firing, as well as those obtained with this embodiment using all four components from both cross-dipole transmitters, are shown in the first two panels. The estimate obtained with the current commercial Alford 4-component rotation is shown in the third panel. The last panel at the right shows the shear slownesses in the fast and slow directions. The figure demonstrates excellent agreement of the azimuth estimates from both versions of the further embodiment with each other and with the current standard, even though the further embodiment uses less stringent assumptions and less data.

The following is an example of the use of the criterion of this embodiment for determining the fast shear direction (azimuth) and comparison of it to the existing Alford four-component rotation technique. The example involves a section of the log in a formation that is medium slow and is mostly sandstone with some dolomite. FIG. 12 shows the results of such a comparison. The first (leftmost) panel shows the azimuth estimated using the two-component version of the criterion described in equation (32). The result of estimating the azimuth using the four-component version as stated in equation (33) is shown in the second panel. The azimuth estimate from the standard Alford 4-component rotation is plotted in the third panel.

There is good agreement of the azimuth estimates of the four component and two component methods with each other and to the standard Alford rotation. However, the technique of the present embodiment does not require matching of the transmitter excitations or depth shifting for non-collocated transmitters, as the Alford method does. Moreover, the estimate using only two dipole components is only slightly degraded compared with the estimates from all four dipole components. The last (rightmost) panel shows the shear slowness as measured from the dipole components along the fast and slow shear directions as determined from the azimuths estimated above. Again there is consistency in the sense that the shear slowness measured for the fast shear direction is consistently faster than that measured for the slow shear direction.

Figure 13A:
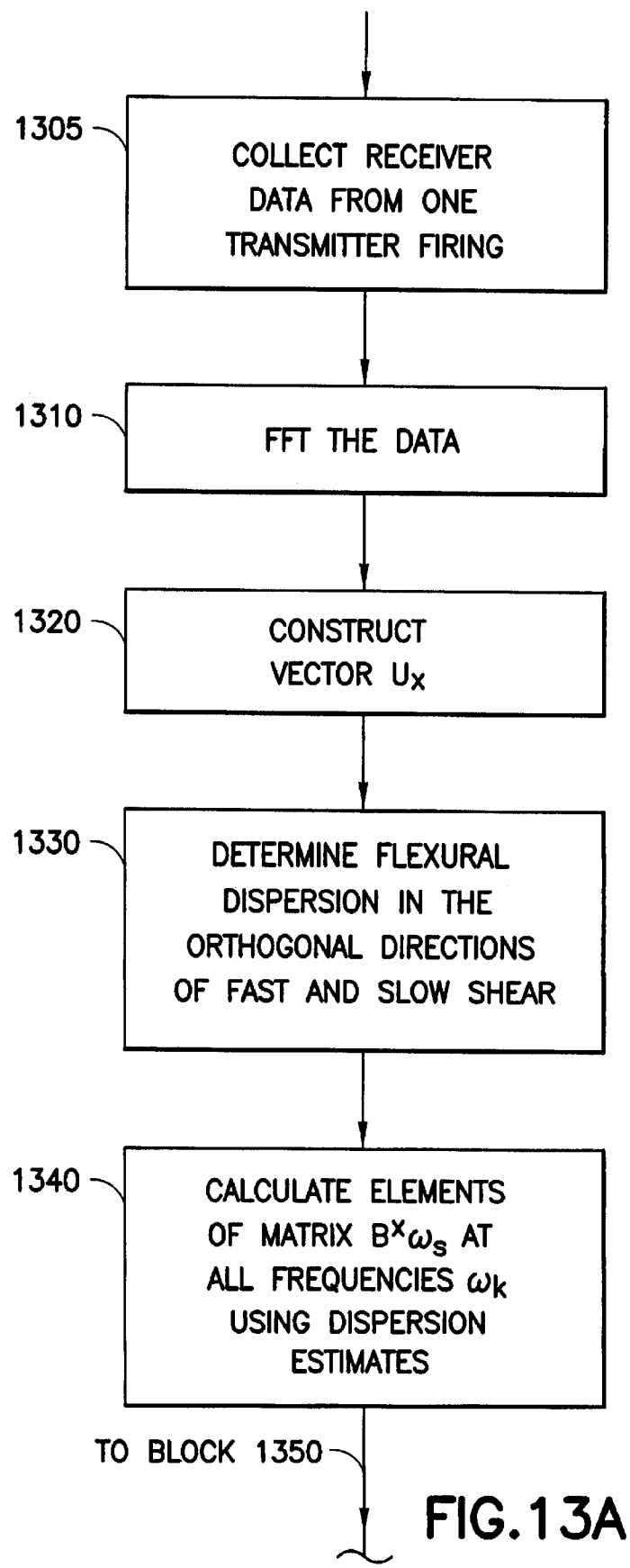
FIGS. 13A and 13B, when placed one beneath another show a flow diagram of a routine for programming a processor to implement an embodiment of the invention.
Figure 13B:
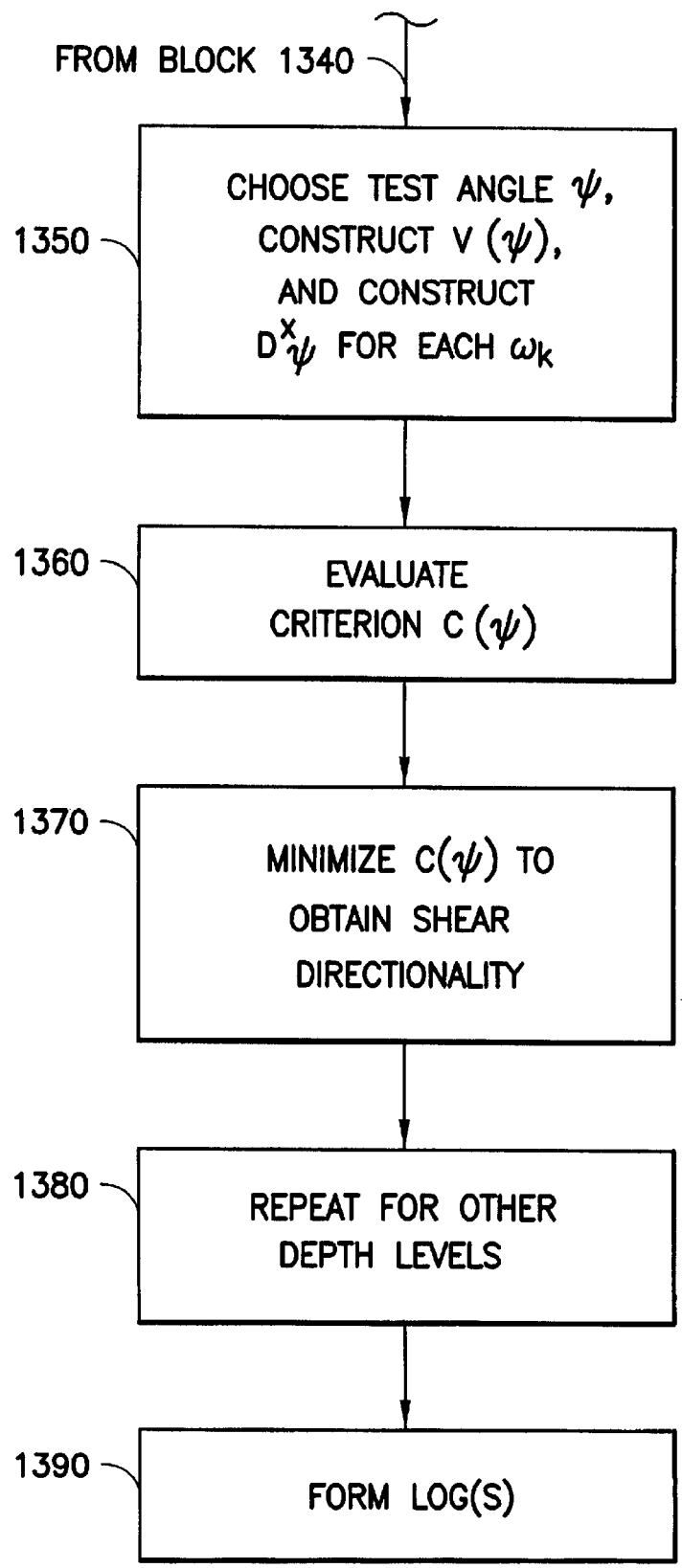

FIG. 13 is a flow diagram of a routine for implementing the just described further embodiment of the invention. The diagram treats the two received component (one transmitter dipole firing) version, whereas the text notes variation for the four component (two transmitter dipole firings) version. The block 1305 represents collecting of the data, and the block 1310 represents FFTing of the inline and cross-line dipole components from one transmitter firing for the two-component version (or all four dipole components acquired from two cross-dipole firings for the four-component version). Next, as represented by the block 1320, the vectors $\underline{u}_x$ (and $\underline{u}_y$ for the four-component version) are constructed from the data from all the receivers at each FFT bin frequency $\omega_k$ as in equations (27) and (28). Then, as represented by the block 1330, the flexural dispersion (slowness at the FFT bin frequencies) in the two orthogonal directions of fast and slow shear are extracted using a method such as the one described by Ekstrom, supra, as in previous embodiment. It can be noted that it suffices to use the inline and cross-line components for the two component case (or the two inline components for the four component version) since in general the dispersion estimates even for un-rotated (not decomposed into components along the fast and slow shear directions) data correspond to either the fast or slow flexural propagation depending on which one is more energetic in that particular component. As an optional refinement, as given below, it is possible to use the dispersion estimates obtained after rotation (or decomposing into fast and slow components) the data and use those to refine the angle estimates. Alternatively, the data can be rotated prior to this step using the estimates from the previous frame. Next, the block 1340 represents calculating the elements of the matrix $\underline{B}^X(\omega_k)$ for all receivers (and dipole transmitters for the four-component version) at each of the FFT bin frequencies $\omega_k$ using the dispersion estimates obtained above. This matrix of three columns is constructed at each frequency as given by equations (19), (22) and (25). The block 1350 is then entered, this block representing the choosing of a test angle $\psi$ and the construction of the 3×1 vector $V(\psi)$ as in equation (23) and then the construction of the 1-d subspace vector $D_\psi{}^X(\omega_k)$ (and $D_\psi{}^Y(\omega_k)$ for 4-component version) for each $\omega_k$ as in equation (30). Then, as represented by the block 1360, $D_\psi{}^X(\omega_k)$ (and $D_\psi{}^Y(\omega_k)$ for 4-component version) and $\underline{u}_x$ (and $\underline{u}_y$ for 4-component version), obtained above, are used to evaluate the criterion $c(\psi)$ indicated in equation (32) (or equation (33) for the four component version). Next, as represented by the block 1370, the derived criterion is minimized over test angles $\psi$ using an optimizer. An example of a suitable minimizer is "fminsearch" in the MATLAB package (Mathworks), although other known minimizations can be used. This is a light minimization since, at each step, the dispersion dependent quantity ($\underline{B}^X$ and $\underline{B}^Y$) remains fixed; only the 3×1 vector $V(\psi)$ needs to be recomputed and used to update the 1-D subspace $D_\psi{}^X(\omega_k)$ (and $D_\psi{}^Y(\omega_k)$). Moreover, the criterion can be shown to be a well-behaved function with only two local minima in the interval of interest $[-\pi/2, \pi/2]$. The technique is repeated for other depth levels (block 1380), and a log is formed (block 1390).

An optional refinement is to rotate or decompose the data into the components along the fast and slow shear directions using the estimates obtained above. The angle estimates are refined by reconstructing the criterion above from the dispersion estimates obtained from these decomposed fast and slow components. In practice, one such iteration should suffice, if at all necessary.

What is claimed is:

1. A method for determining formation shear slowness and shear directionality of formations surrounding an earth borehole, comprising the steps of:

transmitting into the formations, sonic energy from a dipole source in the borehole;

measuring, at each of a plurality of receiver locations in the borehole, spaced at a respective plurality of distances from the transmitter location, signals from orthogonal wave components that have travelled through the formations;

transforming said signals to the frequency domain, and separating dispersive and non-dispersive portions of the transformed signals;

determining fast and slow shear slowness of the formation from the low frequency asymptotes of said dispersive portions of the transformed signals; and determining the shear directionality of the formation by parametric inversion of the received signals.

2. The method as defined by claim 1, wherein said step of determining shear directionality by parametric inversion of the transformed frequency domain signals comprises:

deriving an objective function which is a function of the received signals and of model signal values at a model shear directionality;

determining the particular model shear directionality that minimizes the objective function; and outputting said particular model shear directionality as the formation shear directionality.

3. The method as defined by claim 2, wherein said objective function is non-dependant on the source excitation.

4. The method as defined by claim 2, wherein said objective function is a function of differences between a ratio of orthogonal model signal values and a ratio of signals from measured orthogonal wave components.

5. The method as defined by claim 2, wherein said objective function is a function of the distance of the measured orthogonal wave components from a subspace derived from orthogonal model signal values.

6. The method as defined by claim 1, wherein said step of transmitting into the formation, sonic energy from a dipole source, comprises transmitting from a single dipole source.

7. The method as defined by claim 3, wherein said step of transmitting into the formation, sonic energy from a dipole source, comprises transmitting from a single dipole source.

8. The method as defined by claim 4, wherein said step of transmitting into the formation, sonic energy from a dipole source, comprises transmitting from a single dipole source.

9. The method as defined by claim 5, wherein said step of transmitting into the formation, sonic energy from a dipole source, comprises transmitting from a single dipole source.

10. The method as defined by claim 5, further comprising transmitting into the formations, sonic energy from a further dipole source in the borehole that is at a non-zero angle with respect to the first mentioned dipole source.

11. The method as defined by claim 10, wherein said dipole sources are not precisely matched.

12. The method as defined by claim 5, further comprising transmitting into the formations, sonic energy from a further dipole source in the borehole that is orthogonal to the first mentioned dipole source.

13. The method as defined by claim 10, wherein said first mentioned dipole source and said further dipole source are non-collocated with respect to each to other.

14. The method as defined by claim 4, wherein said objective function is a summation taken over a range of frequencies.

15. The method as defined by claim 14, wherein said summation is also taken over said signals from each of said receiver locations.

16. The method as defined by claim 5, wherein said distance is a summation taken over a range of frequencies.

17. The method as defined by claim 1, wherein said step of determining shear directionality of the formation comprises determining the fast shear direction with respect to the dipole source.

18. The method as defined by claim 1, wherein said step of determining the fast and slow shear slowness includes generating an assumed curve of dispersion, and performing a least squares fit of the transformed signals to said curve.

19. The method as defined by claim 2, wherein said step of determining the fast and slow shear slowness includes generating an assumed curve of dispersion, and performing a least squares fit of the transformed signals to said curve.

20. A method for determining formation shear slowness of formations surrounding an earth borehole, comprising the steps of:
    transmitting into the formations, sonic energy from a dipole source in the borehole;
    measuring, at each of a plurality of receiver locations in the borehole, spaced at a respective plurality of distances from the transmitter location, signals from orthogonal wave components that have travelled through the formations;
    transforming said signals to the frequency domain, and separating dispersive and non-dispersive portions of the transformed signals; and
    determining fast and slow shear slowness of the formation from the low frequency asymptotes of said dispersive portions of the transformed signals.

21. The method as defined by claim 20, wherein said step of determining the fast and slow shear slowness includes generating an assumed curve of dispersion, and performing a least squares fit of the transformed signals to said curve.

22. A method for determining formation shear directionality of anisotropic formations surrounding an earth borehole, comprising the steps of:
    transmitting into the formations, sonic energy from a dipole source in the borehole;
    measuring, at each of a plurality of receiver locations in the borehole, spaced at a respective plurality of distances from the transmitter location, signals from orthogonal wave components that have travelled through the formations; and
    determining the shear directionality of the formation by parametric inversion of the received signals.

23. The method as defined by claim 22, wherein said step of determining shear directionality by parametric inversion of the received signals by parametric inversion of the received signals, comprises:
    deriving an objective function which is a function of the received signals and of model signal values at a model shear directionality;
    determining the particular model shear directionality that minimizes the objective function; and
    outputting said particular model shear directionality as the formation shear directionality.

24. The method as defined by claim 23, wherein said objective function is non-dependent on the source excitation.

25. The method as defined by claim 24, wherein said objective function is a function of differences between a ratio of orthogonal model signal values and a ratio of signals form measured orthogonal wave components.

26. The method as defined by claim 23, wherein said objective function is a function of the distance of the measured orthogonal wave components from a subspace derived from orthogonal model signal values.

27. The method as defined by claim 23, wherein said step of transmitting into the formation, sonic energy from a dipole source, comprises transmitting from a single dipole source.

28. The method as defined by claim 25, wherein said step of transmitting into the formation, sonic energy from a dipole source, comprises transmitting from a single dipole source.

29. The method as defined by claim 26, wherein said step of transmitting into the formation, sonic energy from a dipole source, comprises transmitting from a single dipole source.

30. The method as defined by claim 27, wherein said step of transmitting into the formation, sonic energy from a dipole source, comprises transmitting from a single dipole source.

31. The method as defined by claim 27, further comprising transmitting into the formations, sonic energy from a further dipole source in the borehole that is at a non-zero angle with respect to the first mentioned dipole source.

32. The method as defined by claim 31, wherein said dipole sources are not precisely matched.

33. The method as defined by claim 28, further comprising transmitting into the formations, sonic energy from a further dipole source in the borehole that is orthogonal to the first mentioned dipole source.

34. The method as defined by claim 32, wherein said first mentioned dipole source and said further dipole source are non-collocated with respect to each other.

35. The method as defined by claim 33, wherein said first mentioned dipole source and said further dipole source are non-collocated with respect to each other.

36. The method as defined by claim 26, wherein said objective function is a summation taken over a range of frequencies.

37. The method as defined by claim 36, wherein said summation is taken over signals from each of said receiver locations.

38. The method as defined by claim 27, wherein said distance is a summation taken over a range of frequencies.

39. A method for determining the magnitude of anisotropy of formations surrounding an earth borehole, comprising the steps of:

transmitting into the formations, sonic energy from a dipole source in the borehole;

measuring, at each of a plurality of receiver locations in the borehole, spaced at a respective plurality of distances from the transmitter location, signals from orthogonal wave components that have travelled through the formations;

deriving an objective function which is a function of the received signals and of model signal values at a model shear directionality; and determining the range of values of said objective function, said range being indicative of the magnitude of anisotropy of said formations.

40. The method as defined by claim 39, wherein said objective function is a function of differences between a ratio of orthogonal model signal values and a ratio of signals from measured orthogonal wave components.

41. The method as defined by claim 39, wherein said objective function is a function of the distance of the measured orthogonal wave components from a subspace derived from orthogonal model signal values.

42. The method as defined by claim 39, wherein said objective function is a summation taken over a range of frequencies.

43. The method as defined by claim 42, wherein said summation is also taken over said signals from each of said receiver locations.

44. A method for determining properties of anisotropic formations surrounding an earth borehole, comprising the steps of:

providing a logging device that is moveable through the borehole;

exciting a sonic dipole source at a transmitter location on said logging device to establish flexural waves in the surrounding formations:

measuring at each of a plurality of receiver locations on said logging device, which are spaced at a respective plurality of distances from said transmitter location, signals from orthogonal wave components that have travelled through said formations;

transforming said signals to the frequency domain, and separating dispersive and non-dispersive portions of the transformed signals;

determining fast and slow shear slowness of the formation from the low frequency asymptotes of said dispersive portions of the transformed signals; and determining the shear directionality of the formation by parametric inversion of the received signals.

45. The method as defined by claim 44, wherein said step of determining shear directionality by parametric inversion of the transformed frequency domain signals, comprises:

deriving an objective function which is a function of the received signals and of model signal values at a model shear directionality;

determining the particular model shear directionality that minimizes the objective function; and outputting said particular model shear directionality as the formation shear directionality.

46. The method as defined by claim 45, wherein said objective function is a function of differences between a ratio of orthogonal model signal values and a ratio of signals from measured orthogonal wave components.

47. The method as defined by claim 46, wherein said objective function is a summation taken over a range of frequencies.

48. The method as defined by claim 47, wherein said summation is also taken over said signals from each of said receiver locations.

49. The method as defined by claim 45, wherein said objective function is a function of the distance of the measured orthogonal wave components from a subspace derived from orthogonal model signal values.

50. The method as defined by claim 44, wherein said step of determining shear directionality of the formation comprises determining the fast shear direction with respect to the dipole source.

51. The method as defined by claim 44, wherein said step of determining the fast and slow shear slowness includes generating an assumed curve of dispersion, and performing a least squares fit of the transformed signals to said curve.

52. The method as defined by claim 44, further comprising repeating all steps after the first providing step for different depth levels of said logging device in the borehole, and recording the determined shear slownesses and shear directionality as logs.

53. The method as defined by claim 45, further comprising repeating all steps after the first providing step for different depth levels of said logging device in the borehole, and recording the determined shear slownesses and shear directionality as logs.

54. The method as defined by claim 50, further comprising repeating all steps after the first providing step for different depth levels of said logging device in the borehole, and recording the determined shear slownesses and shear directionality as logs.

55. The method as defined by claim 44, further comprising the steps of repeating said method for different depth levels of said logging device, and producing logs of determined properties.

56. The method as defined by claim 45, further comprising the steps of repeating said method for different depth levels of said logging device, and producing logs of determined properties.

57. The method as defined by claim 51, further comprising the steps of repeating said method for different depth levels of said logging device, and producing logs of determined properties.

58. Apparatus for determining properties of anisotropic formations surrounding an earth borehole, comprising:

a logging device that is moveable through the borehole;

a dipole sonic source at a transmitter location on said logging device for establishing flexural waves in the surrounding formations;

means for measuring at each of a plurality of receiver locations on said logging device, which are spaced at a respective plurality of distances from said transmitter location, signals from orthogonal wave components of split flexural waves that have travelled through said formations;

means for separating dispersive and non-dispersive portions of the transformed signals;

means for determining fast and slow shear slowness of the formations from the low frequency asymptotes of said dispersive portions of the transformed signals; and means for determining the shear directionality of the formations by parametric inversion of the received signals.

* * * * *